United States Patent
Tackett et al.

(10) Patent No.: US 6,532,401 B2
(45) Date of Patent: Mar. 11, 2003

(54) METHODS FOR AUTOMATICALLY VERIFYING THE PERFORMANCE OF A VIRTUAL ROBOT

(75) Inventors: Walter A. Tackett, San Francisco, CA (US); Scott S. Benson, Burlingame, CA (US)

(73) Assignee: Nativeminds, Inc., San Francisco, CA (US)

( * ) Notice: Subject to any disclaimer, the term of this patent is extended or adjusted under 35 U.S.C. 154(b) by 0 days.

(21) Appl. No.: 09/883,129

(22) Filed: Jun. 14, 2001

(65) Prior Publication Data

US 2002/0059045 A1 May 16, 2002

Related U.S. Application Data

(63) Continuation of application No. 09/017,760, filed on Feb. 3, 1998, now Pat. No. 6,259,969, which is a continuation-in-part of application No. 08/868,713, filed on Jun. 4, 1997.

(51) Int. Cl.[7] .............................................. G06F 19/00
(52) U.S. Cl. ...................... 700/245; 700/88; 700/264; 701/29; 701/200; 701/208; 318/568.1; 318/568.14; 710/104; 710/105; 710/266; 706/924
(58) Field of Search ................................ 700/264, 254, 700/249, 88; 701/200, 29, 208; 358/400, 468; 716/1, 2; 710/105, 104, 266, 48, 50, 206, 207; 434/362, 323, 350, 118; 318/568.1, 568.14; 717/1–11; 709/227, 202; 706/924; 714/35–39; 702/182; 704/9

(56) References Cited

U.S. PATENT DOCUMENTS 4,517,154 A * 5/1985 Dennis et al. ............... 180/211
4,595,981 A * 6/1986 Leung ................... 318/568.12

(List continued on next page.)

FOREIGN PATENT DOCUMENTS

| JP | 407239709 A | * | 9/1995 |
| WO | WO 98/55903 | * | 9/1998 |
| WO | WO 00/55761 | * | 9/2000 |

OTHER PUBLICATIONS

Vargas et al., Reliability–oriented HW/SW partitioning approach, 1998, Internet, pp. 1–9.*
Khurshid et al., Checking Java implementation of a naming architecture using test era, 2001, Internet, pp. 1–21.*

(List continued on next page.)

Primary Examiner—William A. Cuchlinski, Jr.
Assistant Examiner—McDieunel Marc
(74) Attorney, Agent, or Firm—Morrison & Foerster LLP

(57) ABSTRACT

In an automated interface program designed to interact and communicate with users, said program executing actions when a category among a predefined set of categories is activated, a method is disclosed for automatically verifying the performance of said program, the steps of said method comprising: specifying inputs under which the program should be tested; associating said inputs with conditions within categories in the program, each said condition comprising at least one response which could be given if said condition is satisfied; executing said program under at least one said input; determining whether the associated condition is satisfied upon said input; and determining whether the response associated with said condition is given upon said input. In another aspect of the present invention, the test inputs are embedded within the script itself, and specifically, within categories that can be automatically listed upon compilation of the script. Such list of test inputs can then be automatically executed to test the program. The execution of a test input can be used to check whether the test input activated the category in which the test input is embedded. The response given upon execution of a test input can then determine whether other categories are erroneously activated; or whether inputs, other than the test input, erroneously activate the category associated with the test input.

9 Claims, 13 Drawing Sheets

U.S. PATENT DOCUMENTS

| | | | |
|---|---|---|---|
| 4,622,013 A | * 11/1986 | Cerchio | 340/436 |
| 4,696,003 A | 9/1987 | Kerr et al. | |
| 5,161,110 A | 11/1992 | Dorchak | |
| 5,204,813 A | * 4/1993 | Samph et al. | 250/253 |
| 5,371,883 A | * 12/1994 | Gross et al. | 714/38 |
| 5,384,893 A | 1/1995 | Hutchins | |
| 5,442,786 A | 8/1995 | Bowen | |
| 5,483,633 A | 1/1996 | Johnson | |
| 5,526,407 A | 6/1996 | Russell et al. | |
| 5,553,218 A | 9/1996 | Li et al. | |
| 5,712,987 A | 1/1998 | Waits et al. | |
| 5,742,754 A | * 4/1998 | Tse | 714/38 |
| 5,758,323 A | 5/1998 | Case | |
| 5,768,499 A | 6/1998 | Treadway et al. | |
| 5,864,844 A | * 1/1999 | James et al. | 345/810 |
| 5,924,089 A | 7/1999 | Mocek et al. | |
| 5,974,405 A | 10/1999 | McGuinness et al. | |
| 5,991,897 A | 11/1999 | Perugini et al. | |
| 5,995,921 A | 11/1999 | Richards et al. | |
| 6,002,868 A | 12/1999 | Jenkins et al. | |
| 6,025,843 A | 2/2000 | Sklar | |
| 6,028,601 A | 2/2000 | Machiraju et al. | |
| 6,028,602 A | 2/2000 | Weidenfeller et al. | |
| 6,041,141 A | 3/2000 | Yamamoto et al. | |
| 6,052,656 A | 4/2000 | Suda et al. | |
| 6,195,657 B1 | * 2/2001 | Rucker et al. | 707/5 |
| 6,200,025 B1 | * 3/2001 | Rich | 378/207 |
| 6,275,813 B1 | * 8/2001 | Berka | 705/30 |

OTHER PUBLICATIONS

Bertolino, KA description of software testing V. 0.5, no date, Internet, pp. 1–8.*

Bousquet et al., Specification–based testing of synchronous software, no date, Internet, pp. 1–17.*

Choi et al., Cooperative manipulation of a virtual object by multiple remote users, 2000, KSME Dialog/International Journal, Vo 14, No. 9. pp. 956–967.*

Natonek et al., Model based vision as feedback for virtual reality robotics environments, 1995, Internet/ IEEE, pp. 110–117.*

Chapiro, Automating verification using testbench languages, 1999, Internet, pp. 1–4.*

Chang et al., Ditstributed software testing with specification, 1990, Internet/IEEE, pp. 112–117.*

Abts et al., Verifying lang–scale multiprocessors using an abstract verification environment, UNK, Internet, pp. 1–6.*

Fluckiger, A robot interface using virtual relaity and automatic kinematics generator, 1998, Dialog, pp. 123–126.*

Manufacturing in Cyberspace (CAD/CAM package for machining processes), 1995, Dialog, pp. 1–3.*

Sato et al., A virtual object manipulation interface for automated assembly programming, 1994, Internet/IEEE, pp. 18271831.*

Choi et al., Adaptive learning of teleoperating robotic motion, 1997, Internet/IEEE, pp. 2752–2757.*

R. Kaplan, "A General Syntactic Processor", In natural Language Processing, Rustin ed., Algorithmics Press, Inc., 1975, pp. 193–241.

R. Reichman, "Conversational Coherency", Cognitive Science 2:283–327, 1978.

R. Reichman, "Getting Computers to Talk Like You and Me", A Bradford Book. The MIT Press, ch. 2, pp. 21–33, ch. 5, pp. 67–90, ch. 6, pp. 155–166, 1985.

C. L. Sidner, "Plan Parsing For Intended Response Recognition in Discourse", Comput. Intel. 1985, 1:1–10.

B. J. Grosz et al., "Attention, Intentions and the Structure of Discourse", Computational Linguistics 1986, 12(3):175–204.

B. J. Grosz, "The Representing and Use of Focus in a System for Understanding Dialogs", In Readings in Natural Language Processing, 1986, pp. 353–362.

C. L. Sidner, "Focusing in the Comprehension of Definite Anaphora", In Readings in Natural Language Processing, 1986, pp. 363–394.

R. Cohen, "Analyzing the Structure of Argumentative Discourse", Computational Linguistics 13(1–2):11–24, 1987.

B. J. Grosz et al., "TEAM: An Experiment in the Design of Transportable Natural–Language Interfaces", Artificial Intelligence 32:173–243, 1987.

D. Litman et al., "A Plan Recognition Model for Subdialogues In Conversations", Cognitive Science 11:163–200, 1987.

J. Hirschberg et al., "Empirical Studies on the Disambiguation of Cue Phrases", Computational Linguistics 19(3):501–530. (1993).

J. Allen, "Natural Language Understanding", The Ben. Cummings Publishing Co. ch. 14, pp. 429–461, ch. 16 and 17 pp. 503–576, 1995.

* cited by examiner

Web Interface Case (Chat Site/Virtual World Interface Case)

METHODS FOR AUTOMATICALLY VERIFYING THE PERFORMANCE OF A VIRTUAL ROBOT

STATEMENT OF RELATED CASES

This current application is a continuation application of Ser. No. 09/017,760 entitled "System and Method For Automatically Verifying the Performance of A Virtual Robot", filed Feb. 3, 1998, now U.S. Pat. No. 6,259,969, which is a continuation-in-part of Ser. No. 08/868,713, entitled "System and Method for Automatically Focusing the Attention of a Virtual Robot Interacting with Users", filed Jun. 4, 1997.

REFERENCE TO A "MICROFICHE APPENDIX"

The referenced microfiche appendix is on deposit at the U.S. Patent and Trademark Office and was submitted with related application Ser. No. 09/017,760. The microfiche appendix comprises source code of a present embodiment of the present invention. There are 178 frames contained in 2 pages of microfiche.

BACKGROUND OF THE ART

For the purposes of the present invention, "virtual robots" (or "BOTs") are software programs that interact and/or communicate with users (human, machine or otherwise) that take actions or make responses according to input from these users. BOTs are the subject of the co-pending and co-assigned parent application entitled "Methods for Automatically Focusing the Attention of a Virtual Robot Interacting with Users", filed Jun. 4, 1997, Ser. No. 08/868,713, and incorporated by reference in its entirety herein. A common use of such a BOT is as an interface to a web site wherein the administrator of that site has programmed the BOT to answer simple inquiries that are typically asked by visitors to the site. The above identified application discloses a method of creating BOTs according to "scripts"—i.e. programs that are written in a very high level language that closely resembles a human natural language. These scripts embody a certain amount of information concerning the site that the administrator desires the BOT to communicate to a user during a connection session.

If a BOT is to be deployed in a publicly accessible way such as a web page or chat site, there is a need to test the BOT as thoroughly as possible to ensure that, as often as possible, it will produce an appropriate response to the inputs that it is likely to receive and the situations that it is likely to encounter. In this context, "input" refers to any description of a situation the BOT may encounter; although the most common inputs are textual inputs from users, inputs can be actions taken by users, external circumstances, or even events internal to the BOT such as an internal alarm clock. If the BOT can be tested in advance, the person or organization that is deploying the BOT can be more certain of its likely performance, and errors can be detected in advance that might otherwise result in mistakes that could mislead users interacting with the BOT and/or reflect poorly on the authors or deployers of the BOT.

Historically, most BOTs have been tested manually, by having a human user or set of human users interact with the BOT and observe any errors it might make. Such testing is ordinarily done when the BOT is first written, and may continue throughout the lifetime of the BOT as changes are made to it. Testing can also be said to occur after deployment as users interact with the BOT; errors found through this form of testing indicate that the BOT has already made a mistake when publicly deployed. Thus, there is a need to test thoroughly before public deployment.

Such human testing, although usually necessary, has a number of drawbacks. First, it is time-consuming. A typical BOT may contain thousands of possible responses, all of which need to be tested. Second, it is usually incomplete. Unless the testers are given a list of all possible responses that should be tested, the testers will only cover a subset of the possible responses. Furthermore, if the response given to an input may depend on the context, there is an exponential number of response sequences that must be tested. Finally, it is difficult to maintain assurance as changes are made to the BOT. In most BOTs, each change can potentially affect the responses given to many other inputs, so the entire testing effort must be repeated for each set of changes that are made to the BOT.

One possible solution to assist in the testing process is to create a "script" containing possible inputs and the expected responses. These inputs can either be textual inputs to the BOT or descriptions of other conditions for which the BOT should have a response. This script can then be used for automated testing by presenting each input to the BOT and determining whether the proper response is produced. Scripts are commonly used in the verification of other computer programs and could easily be applied to BOTs as well.

The use of such scripts has a number of desirable properties: once the script is developed, the BOT can be tested quickly; the script can be made as complete as needed; and the script, with appropriate modifications, can be re-tested any time changes are made to the BOT. However, there are still a number of drawbacks to the use of scripts for testing BOT performance. First, it is a significant effort to create the initial script. There may be thousands of inputs and responses that need to be included. Second, modification of such a script is difficult. Every time a response is changed or a new response is added, the script must be updated. The size of the script increases the complexity of this task. Thus, in order to change or add a response, the user must potentially search through thousands of inputs and responses to find the appropriate place to change or add the response. Third, a straightforward script still does not allow for the easy testing of cases in which the response may vary depending on the sequence of previous inputs—although a more complicated "test scripting" language can help with this problem. Finally, in cases where the correct response was not given, such a script does not ordinarily provide enough information to produce an error message that contains more information than the fact that the correct answer was not given.

There are a variety of well-known techniques that are used for verification of programs in traditional programming languages such as C or FORTRAN. However, the problems faced in automatic verification of natural language systems are significantly different than the problems faced in verification of other computer programs. In most programs, for instance in a typical numerical analysis system, the intended behavior of the system can be described for all possible inputs, and ordinarily there is only one or a few qualitatively different output possibilities. However, in a typical natural language system, there may be thousands of possible responses to inputs, all of which must be tested to insure that they will be given in response to appropriate inputs, and not given in response to inappropriate inputs. Well-known techniques of black-box testing can be applied to such a system, but as described in the previous paragraph, there are significant problems with such an approach.

Thus, there is a need in the art to have a means of automatically verifying the performance of a BOT that allows the creation of the testing information simultaneously with the development of the BOT and that allows the BOT author to easily modify the testing information as the BOT is modified.

There is also a need for the verification mechanism to be given sufficient information to provide useful diagnostic output when an error is found, in addition to simply reporting the error.

There is also a need, in the case where the response given by the BOT may vary depending on previous inputs given to the BOT, for the verification mechanism to be able to verify that a response will be given correctly regardless of the prior sequence of inputs the BOT has seen, or that a response will be given correctly under the condition that a particular sequence of inputs precedes it. There is a need for such verification to be done efficiently, without the need for testing an exponential number of sequences of inputs and responses.

SUMMARY OF THE INVENTION

The present invention meets these aforementioned needs by providing a variety of mechanisms for verifying the performance of a virtual robot or BOT. In an automated interface program designed to interact and communicate with users, said program executing actions when a category among a predefined set of categories is activated, a method is disclosed for automatically verifying the performance of said program, the steps of said method comprising:

(a) specifying inputs under which the program should be tested;

(b) associating said inputs with conditions within categories in the program, each said condition comprising at least one response which could be given if said condition is satisfied;

(c) executing said program under at least one said input;

(d) determining whether the associated condition is satisfied upon said input; and (e) determining whether the response associated with said condition is given upon said input.

In another aspect of the present invention, the test inputs are embedded within the script itself, and specifically, within categories that can be automatically listed upon compilation of the script. Such list of test inputs can then be automatically executed to test the program. The execution of a test input can be used to check whether the test input activated the category in which the test input is embedded.

The response given upon execution of a test input can then determine whether other categories are erroneously activated; or whether inputs, other than the test input, erroneously activate the category associated with the test input.

Other aspects of the verification mechanisms are disclosed in the description given below when read in conjunction with the accompanying figures.

DETAILED DESCRIPTION OF THE INVENTION

I. Overview and General Architecture

The term "robot" is used interchangeably with "BOT" throughout the remainder of this application. For the purposes of the present invention, both "BOT" and "robot" refer to any program which interacts with a user in some fashion, and should not be assumed to refer only to physically embodied robots.

Figure 1:
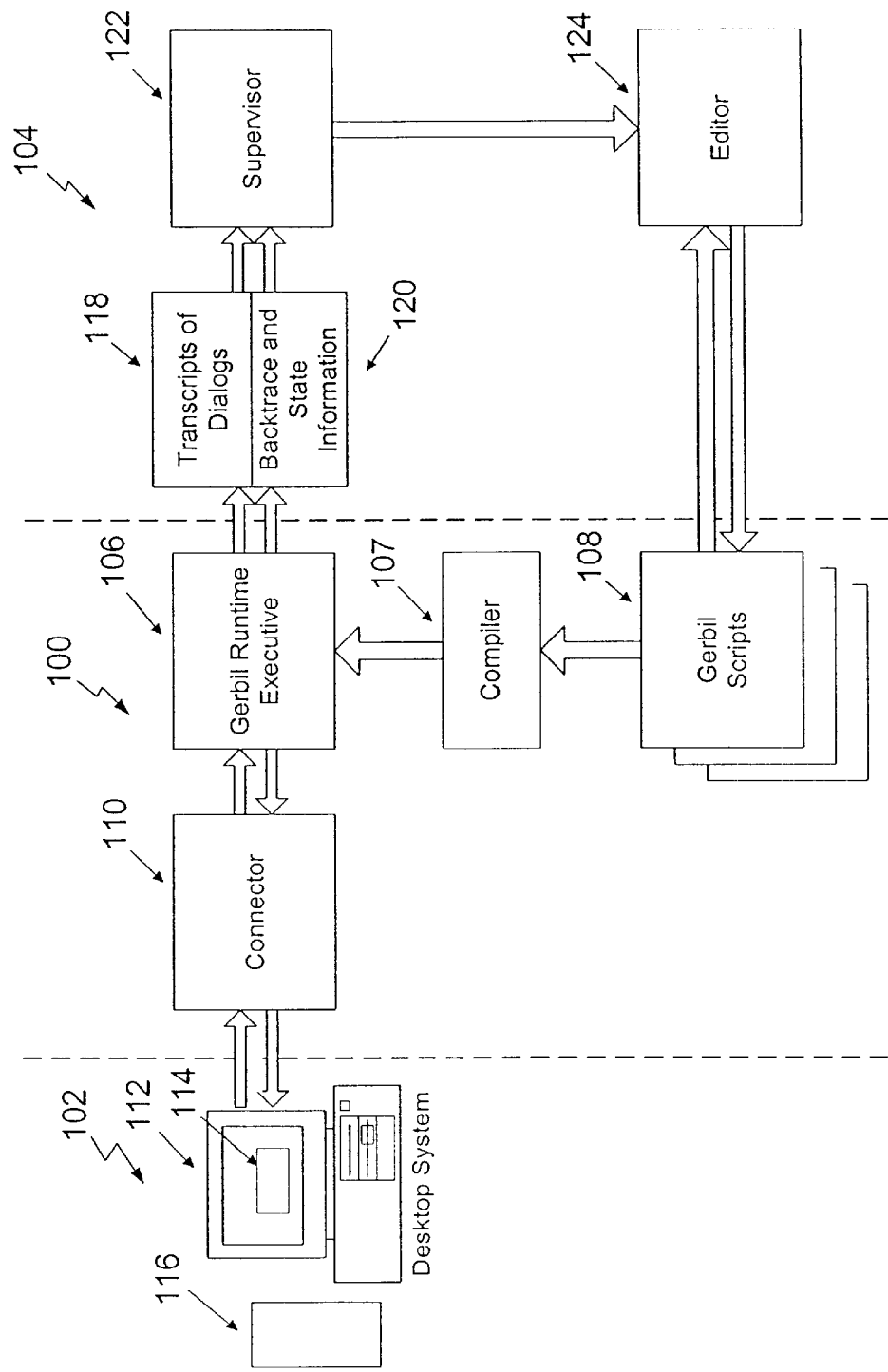
FIG. 1 depicts a suitable operating environment for the purposes of the present invention.

Referring now to FIG. 1, the operating environment of the present invention is depicted. The environment can be characterized generally into three partitions: front end 102; BOT processor 100; and back end 104. Front end 102 is generally the environment in which a human user 116 consults a virtual BOT interface 114 via a computer 112 that may be connected to the BOT processor via a communications link, such as through a server connected to the Internet or alternatively directly connected to BOT processor 100. It will be appreciated that many other means of connection to BOT processor 100 are well known to those skilled in the art and that the present invention should not be limited to the any particular aspects of the general operating environment as disclosed herein.

Typically, human user 116 connects to a site whose interface of first impression is a virtual BOT interface 114. The advantage for the site developer is that human user 116 may have a help or information request that is easily handled via BOT interface 114. Today, it is not uncommon to find sites having a list of FAQs ("Frequently Asked Questions") that serve this purpose of handling very low level user concerns and questions. However, for more advanced questions or interactions with the site, virtual BOTs will become increasing popular.

In the operating environment of this embodiment of the present invention, BOT interface 114 is an instantiation of a process that is spawned by BOT processor 100 via connection 110. BOT processor 100 itself may comprise connection 110; runtime executive process 106, compiler 107, and a set of BOT programs 108. As users 116 log onto a site having BOT processor 100 via connection 110, runtime executive 106 executes an interaction routine that guides the discussion that occurs between user 116 and BOT processor 100. Typically, a two way communications dialogue occurs between user 116 and BOT processor 100 wherein user 116 may ask questions, make declarative statements and other normal communications patterns that humans typify. For the purposes of the present invention, "communications" is to be very broadly interpreted. Indeed, suitable communications could be in the form of written or spoken language, graphics, URL's or the like that may be passed to and from a user to an automatic interface program, such as the present invention.

In turn, runtime executive 106 parses the statements and questions generated by the user and responds according to a set of BOT programs 108. As will be discussed in greater detail, BOT programs 108 are typically created at the back end 104 as a set of "scripts" that the BOT processor will tend to engage in with user 116. For example, if the site using BOT processor 100 is a site for a reseller of personal computers, then BOT processor 100 should be designed to handle questions and discussions concerning personal computers and their peripherals in general. Thus, the back end 104 will generate scripts that will guide the discussion concerning many computer-related topics. These script programs 108 are then compiled by compiler 107 and the compiled code is incorporated into runtime executive 106. As will be discussed below, these scripts are written in an English-like language called "Gerbil™"—the name derived from "General Robot Builder Language", as developed by the present assignee, Neuromedia, Inc.

As the two-way discussions between user 116 and runtime executive 106 continue, it is generally desirable to engage in quality control of BOT processor 100. This quality control is provided at back end 104 via feedback loop comprising a transcript of dialogues 118 and backtrace and state information 120 of the BOT processor 100; a supervisor 122 and editor 124. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 122 analyzes the information at 118 and 120 with an eye towards optimizing the performance of the runtime executive. Typically, supervisor 122 could be another human, deciding if the semantics captured by the system needs to be upgraded in response to a dialog transcript that has occurred. If so, supervisor 122 could optionally invoke an editor 124 to edit the Gerbil programs that represent the semantic framework of the runtime executive. These programs would then be re-compiled and incorporated into the runtime executive. Supervisor 122 could be a software program (as opposed to another human) that would automatically seek to analyze the performance of the runtime executive and make corrections to the runtime executive through the editing process.

Figure 2:
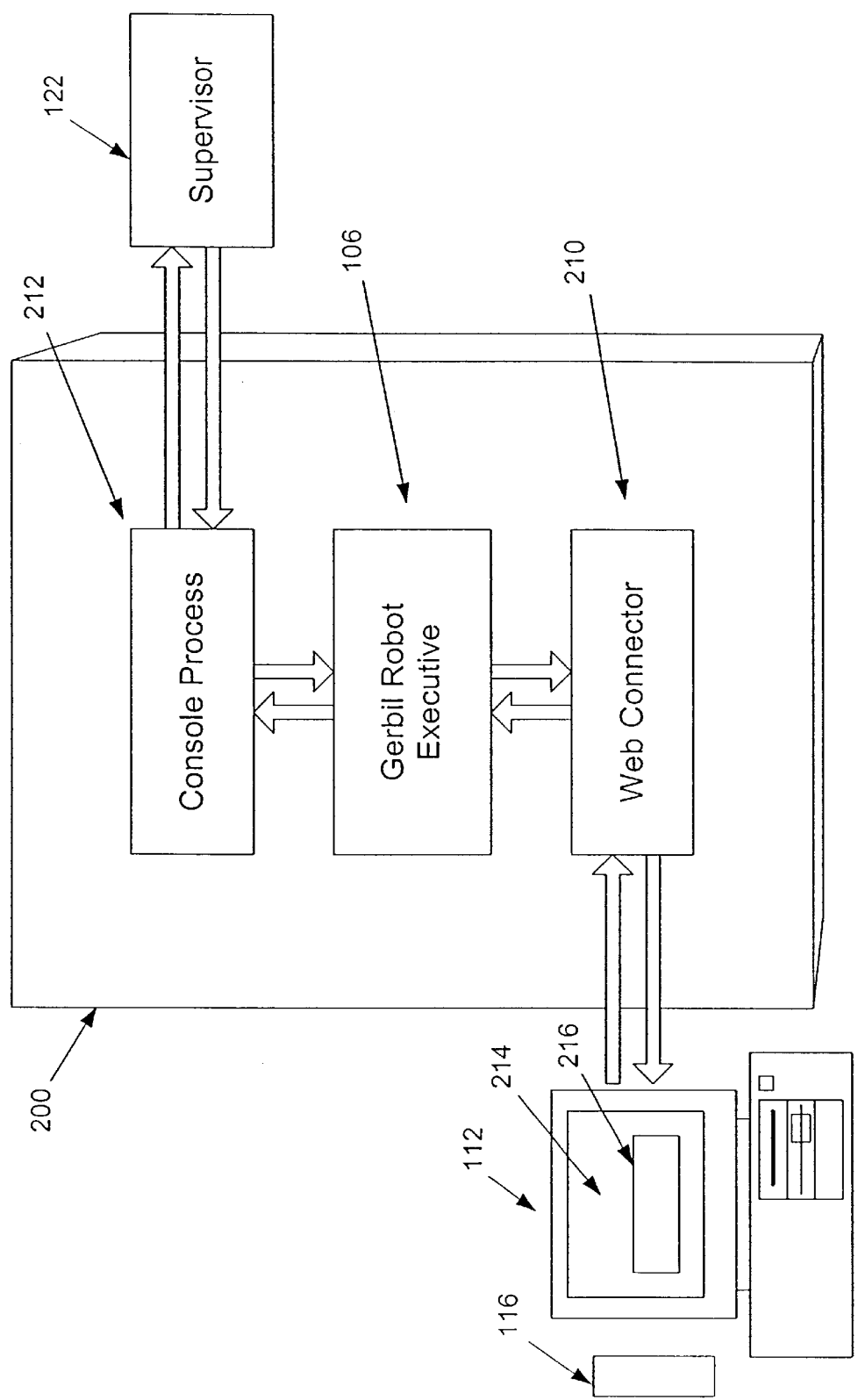
FIG. 2 depicts different operating environments for the purposes of the present invention wherein the connection to user 116 is via an intranet or internet connection.
Figure 3:
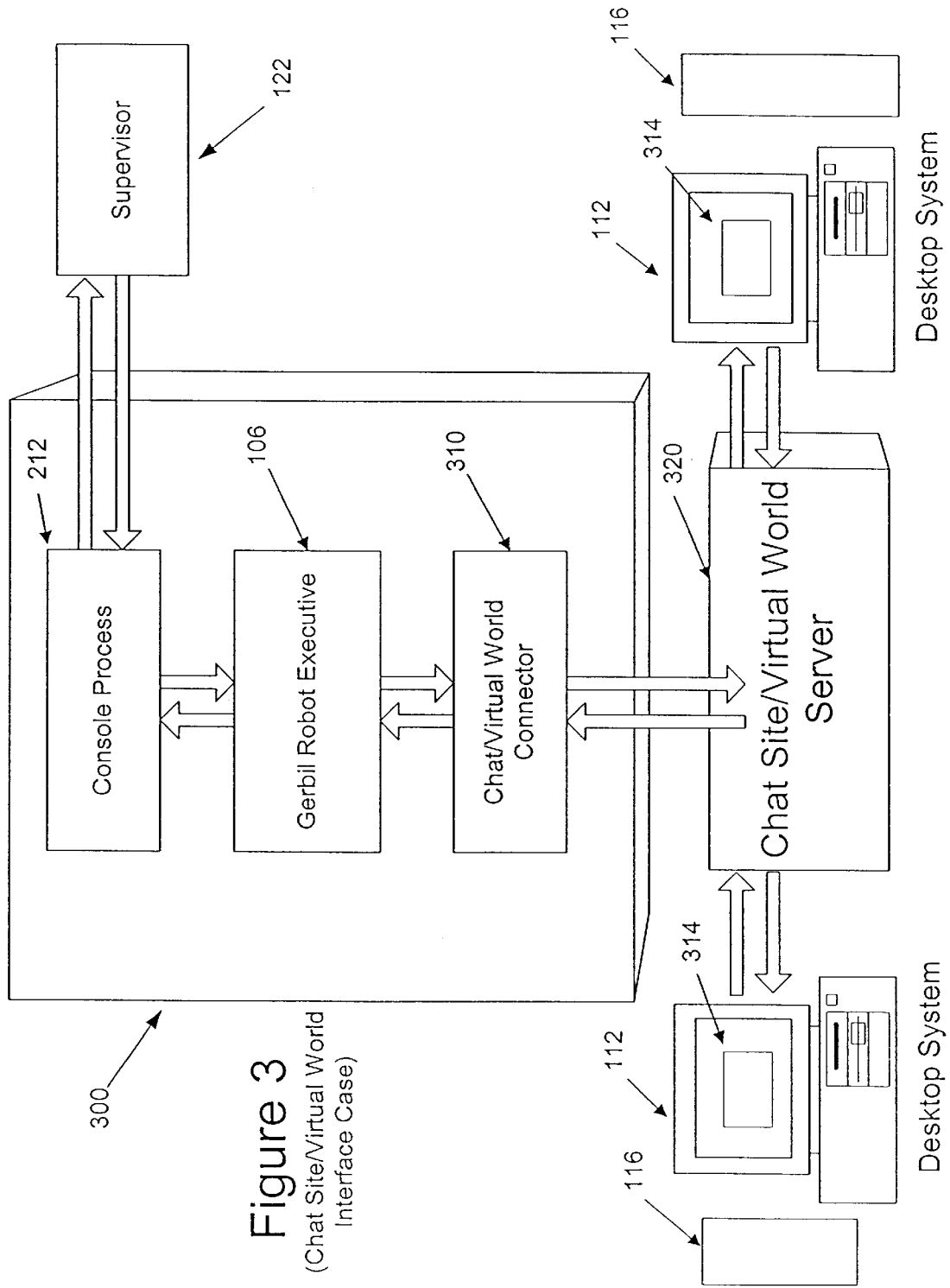
FIG. 3 depicts yet another operating environment wherein the BOT processor is merely a client of another server, such as a chat room or virtual world server.

FIGS. 2 and 3 depict slightly different operating environments for the purposes of the present invention. FIG. 2 depicts a situation wherein the BOT processor 200 connects to user 116 is via an intranet or internet connection e.g. web connector 210. For example, web connector 210 may thus spawn a Java applet 216 inside of an HTML page 214 to provide the two-way communications as discussed above. It will be appreciated that such use of Java applets embedded in HTML pages is well known to those skilled in the art. Alternatively, HTML page 214 might communicate directly with web connector 210 via a CGI connection or some other well-known connection protocol. Likewise, the BOT server can accept HTML requests directly. In such cases, persistent state information can be tracked by a "cookie" set in the web browser or similar means.

As is shown, supervisor 122 interfaces with robot executive 106 via console process 212. Console process 212 monitors the execution of robot executive 106 and may do so with a reduced set of monitoring tasks, such as merely checking to see if robot executive 106 is actively running. FIG. 3 depicts a situation wherein the BOT processor 300 is merely a client of another server, such as a chat room or virtual world server, as depicted by server 320. BOT processor 300 is connected to server 320 via a chat/virtual world connector 310 in much the same fashion as any client would connect to a server site. Users 116 that desire to talk or converse with the BOT processor 300 interact through their client connections 314 in much the same fashion as any client-to-client communications that would be effected on server 320.

Although FIGS. 1, 2 and 3 give a general description of various operating environments in which virtual BOTs may exist, it will be appreciated that many other operating environments are obvious to those skilled in the art and that the scope of the present invention should not be so limited to the exemplary descriptions as given above.

II. Bot Processor Description

A. Script Programs and Language

As mentioned above, runtime executive 106 embodies the necessary information to maintain a reasonable conversation with human users to answer their inquiries and to carry on a general discourse with them on a set of topics. These topics are created by the back end in the form of script programs 108 that are compiled (or interpreted) and incorporated into runtime executive 106. In the preferred embodiment of the present invention, script programs may be written by human designers having little or no formal programming experience. It will be appreciated that script programs can also be written by automated learning programs or through partially automated script creation tools, and that the present invention should not be limited to human-written script programs. Two exemplars of such script programs are given below in Table 1.

TABLE 1

TWO EXAMPLE SCRIPT PROGRAMS

EXAMPLE 1
Topic "CatsOrComputers" is
    IfHeard "cat","computer" then
        IfHeard "cat" then
            Say "What would you like to know about my cat?";
            Focus "Cats";
        Done

TABLE 1-continued

TWO EXAMPLE SCRIPT PROGRAMS

```
            IfHeard "computer" then
                Say "What would you like to know about my computer?";
                Focus "Computers";
            Done
        Done
EndTopic
Topic "Cats" is
    IfHeard "cat","it" then
        IfHeard "mouse" then
            Say "It caught a mouse once and brought it" ,
                "to me as a present";
        Done
    Done
EndTopic
Topic "Computers" is
    IfHeard "computer","it" then
        IfHeard "mouse" then
            Say "The mouse is a PS/2 type mouse with three buttons";
            SwitchTo "Mouse Sales";
        Done
    Continue
EndTopic
Topic "Unknown Input" is
    If ?WhatUserSaid DoesNotContain "cat","computer","mouse","it" then
        Say "Would you like to know about Cats or Computers?";
    Done
EndTopic
Sequence Topic "Mouse Sales" is
    Always
        Say "Would you like to buy one?";
        WaitForResponse;
        IfHeard "no" Then
        Done
        Say "OK, what is your name?";
        WaitForResponse;
        Remember ?UserName is ?WhatUserSaid;
        Say "That will be $199.95",
            "Please enter your credit card number now";
        WaitForResponse;
        Remember ?CardNum is ?WhatUserSaid;
        Say "OK, We'll mail one to you within two weeks";
            "Please give me your mailing address now.";
        WaitForResponse;
        Remember ?Address is ?WhatUserSaid;
    Done
EndTopic
Priority Topic "Swearing Filter" is
    IfHeard "fudge" Then // a popular swear word. . .
        Say "I'm sorry, that kind of language is not permitted here";
        Do "kick user off system";
    Done
EndTopic
EXAMPLE 2--
Topic "Price of XV17" is
    Subjects "XV17", "cost";
    IfHeard "XV17", "it" Then
        IfHeard "cost", "how much", "what about" Then
            Say "The XV17 monitor is now available for $699";
        Done
    Continue
EndTopic
Topic "Size of XV17" is
    Subjects "XV17" , "features";
    IfHeard "XV17", "it" Then
        IfHeard "size", "how big", "what about" Then
            Say "The XV17 monitor has a 17 inch full-color screen";
        Done
    Continue
EndTopic
Topic "Maker of XV17" is
    Subjects "XV17", "maker";
    IfHeard "XV17", "it" Then
        IfHeard "who makes", "what about" Then
            Say "The XV17 monitor is made by NEC";
        Done
    Continue
EndTopic
Topic "Price of 5SG" is
```

TABLE 1-continued

TWO EXAMPLE SCRIPT PROGRAMS

```
    Subjects "5SG", "cost";
    IfHeard "5SG", "it" Then
        IfHeard "cost", "how much", "what about" Then
            Say "The 5SG monitor is now available for $499";
        Done
    Continue
EndTopic
Topic "Size of 5SG" is
    Subjects "5SG", "features";
    IfHeard "5SG", "it" Then
        IfHeard "size", "how big", "what about" Then
            Say "The 5SG monitor has a 14 inch grayscale screen";
        Done
    Continue
EndTopic
Topic "Maker of 5SG" is
    Subjects "5SG", "maker";
    IfHeard "5SG", "it" Then
        IfHeard "who makes", "what about" Then
            Say "The 5SG monitor is made by MonitorTech";
        Done
    Continue
EndTopic
Topic "Price of 6SC" is
    Subjects "6SC", "cost";
    IfHeard "65C", "it" Then
        IfHeard "cost", "how much", "what about" Then
            Say "The 6SC monitor is now available for $899";
        Done
    Continue
EndTopic
Topic "Size of 6SC" is
    Subjects "6SC", "features";
    IfHeard "6SC", "it" Then
        IfHeard "size", "how big", "what about" Then
            Say "The 6SC monitor has a 19 inch full-color screen";
        Done
    Continue
EndTopic
Topic "Maker of 6SC" is
    Subjects "6SC", "maker";
    IfHeard "6SC", "it" Then
        IfHeard "who makes", "what about" Then
            Say "The 6SC monitor is made by MonitorTech";
        Done
    Continue
EndTopic
```

Considering the two script programs above, several aspects of the scripting language become apparent. First, as designed, the script language uses language primitives that are very close to human natural language. Thus, this scripting language is easy to use by users that have no facility in programming languages per se. TABLE 2 is a BNF (Backus Normal Form) description of the present embodiment of the scripting language:

TABLE 2

BNF DESCRIPTION OF THE SCRIPTING LANGUAGE WITH COMMENTS

```
<Program>=<Statement>*
<Statement>=<Definition>|<Category>
<Definition>=<PatternDef>|<PatternListDef>|<CategoryListDef>|
             <AttributeDef>|<OtherExampleDef>|<SubjectInfoDef>
<PatternDef>=Pattern<symbol>is<string>;
<PatternListDef>=PatternList<symbol>is<string>[,<string>*];
<CategoryListDef>=<CatListType><symbol>is<string>[<string>*];
<CatListType>=TopicList|ScenarioList|Category;
<AttributeDef>=Attribute<memref>;|Attribute<memref>specificity
              <integer>;
<OtherExampleDef>=OtherExamples of<string>are<patlist>;|
                  OtherExamples of<string>WhenFocused are
                  <patlist>;
<SubjectInfoDef>=SubjectInfo<SubjectName>is
                 Replace<pronoun>with<replacement>
                 [, Replace<pronoun>with<replacement>|
                 , <pronoun>with<replacement>]*;
<SubjectName>=<string>
<pronoun>=<string>
<replacement>=<string>
```

There are two types of statements in a program: constant definitions and input processing categories. All run-time processing of a user input is handled in the categories.

Patterns are used to assign a name to a fixed string. The name can then be used in place of the string throughout the program, for readability and ease of modification. Similarly, a PatternList is used to assign a name to a list of strings, and a TopicList, ScenarioList, or CategoryList is used to assign a name to a list of category names (see below.) Attribute declarations are used to declare attributes so that information about them can be displayed through various debugging functions. Declaration of attributes is optional; attributes can be used without being declared. An attribute declaration can also assign a "specificity" value that is used when the attribute is tested using IfRecall or any matching condition. If an attribute is not declared, or is not given a specificity value in its declaration, it is given the default specificity value of 2000. OtherExamples declarations define additional arguments for a particular example statement. These additional arguments are tested whenever the original example is tested using the automatic verification mechanism. An OtherExample declaration can also include the keyword When-Focused to indicate that the arguments are context-sensitive examples.

A Subjectinfo declaration is used to assign pronoun replacement pairs to subjects, ordinarily subjects that have been assigned to one or more topics in the BOT script; the Subjectinfo declaration has no effect for subjects that are not defined. The pronoun and replacement can be any string. However, the invention is most commonly used for replacing the values of common English pronouns such as "he". It is illegal for the same pronoun to be included more than once for a given subject, or to declare subject information for a subject more than once.

```
<Category>=<Topic>|<Scenario>
<Topic>=<CategoryInfo>Topic<string>is<Tstatement>*EndTopic
<Scenario>=<CategoryInfo>Scenario<string>is<Sstatement>*
          EndScenario
<CategoryInfo>=[Suppressed][Priority|Default|Sequence]
```

A category is either a topic or a scenario. A topic is used to process user statements, while a scenario is used to process user actions. The term "category" is used to generically refer to a topic or scenario.

Categories are divided into four types, priority, standard, default, and sequence, according to the label preceding the word "topic" or "scenario". A category that is not labeled is a Standard type. When the user makes a statement or takes an action, the categories in the program are executed, until a Done is reached (see below.) All priority categories are executed first, in the order in which they appear in the program. Next, all standard categories are executed. The order in which standard categories are executed changes dynamically depending on the execution of the program, and is described in the next paragraph. Finally, all default categories are executed, in the order in which they appear in the program. Sequence categories are executed only when explicitly accessed in a SwitchTo statement.

Standard categories are executed according to a "best-fit" matching mechanism, in which ties are broken according to an ordered list that initially corresponds to the order in which they appear in the program. When a standard category is executed, it, and other categories that share at least one Subject, is moved to the front of the standard category list (and so will be executed first on the next input.) The order of the standard category list can also be changed by commands within the program, as described below.

Categories can also be temporarily suppressed, in which case they are not executed at all. If the keyword Suppressed appears in front of the category definition, it is initially suppressed. Category suppression is discussed further below.

```
<Tstatement>=<MemoryLock>|<SubjectList>|<Tconditional>
<Sstatement>=<MemoryLock>|<SubjectList>|<Sconditional>
<Tconditional>=<Condition>(<Comand>|<Tconditional>)*
                    <TconditionalEnd>|
              <Tcaonditional>Otherwise<Tconditional>
<Sconditional>=<Conditional>(<Command>|<Sconditional>)*
                    <SconditionalEnd>|
              <Scaonditional>Otherwise<Sconditional>
<TconditionalEnd>=Done|Continue|NextTopic|TryAgain|SwitchBack
<SconditionalEnd>=Done|Continue|NextScenario|TryAgain|SwitchBack
```

The body of each category is a list of conditional blocks. These conditional blocks are executed in the order found in the category. If the condition of a conditional block is false, execution goes on to the next conditional block in the category, or to the next category if there are no further conditional blocks. If the condition is true, the commands and conditional blocks inside the block are executed, and further behavior of the program is dependent on the keyword which ends the conditional block. If it ends with Done, execution ceases until the next input occurs (unless an InterruptSequence has been executed; see below.) If it ends with Continue, execution continues with the next conditional block in the category, or the next category if there are no further conditional blocks. If it ends with NextTopic/NextScenario, the rest of the current category is skipped and execution continues with the next category. If it ends with TryAgain, the most recent WaitForResponse within the block is executed (it is an error to end a block with TryAgain if it does not contain a WaitForResponse.) If it ends with SwitchBack, execution resumes immediately following whichever SwitchTo statement switched to the current block. It is an error to end a block with SwitchBack if the block is not inside a Sequence topic.

Conditional blocks can be combined using the Otherwise keyword; if the first condition is true then the condition block(s) that follow the Otherwise keyword are not executed. This behavior is similar to the behavior of an "else" command in C and similar programming languages.
<MemoryLock>=MemoryLock<memref>[,<memref>]*;

The top level of a category may contain one or more MemoryLock statements. Each MemoryLock statement asserts that the value of one or more associative memory elements should only be changed within that category. If an associative memory key ?x is MemoryLocked in a category C, it is an error for a program to assign a value to ?x using Remember or Forget anywhere outside the category C, or to MemoryLock ?x in some other category.
<SubjectList>=Subjects<string>[,<string>]*;

The top level of a category may contain one or more Subjects statements. Each asserts that the given subjects are subjects of the topic. If a non-IF command within the body of the topic is executed, all topics which share at least one Subject with the topic are brought to the front of the focus of attention.

```
<Condition>=<SingleCondition>Then
   | <SingleCondition>[and<SingleCondition>]* Then
   | <SingleCondition>[or<SingleCondition>]* Then
   | If<ConditionClause>[and<ConditionClause>]* Then
   | If<ConditionClause>[or<ConditionClause>]* Then
   | IfChance Then
   | Always
```

A condition can either be a basic condition (described below) or a Boolean combination of basic conditions. A Boolean combination of basic conditions that includes both and and or keywords must use parentheses to prevent possible ambiguity; there is no built-in operator precedence between and and or in GeRBiL. The Boolean not operator is implemented within the basic conditions; there is no explicit not keyword that applies to conditions. Finally, there are two basic conditions that cannot be combined using Boolean operators. The IfChance condition with no numeric argument is a probabilistic condition that has the same likelihood of being true as all the other argument-less IfChance statements immediately before or after it. Finally, the Always condition is simply always true.

```
<ConditionClause>=<MatchLHS><PosMatchKeyword>
                     <MatchingList>
  | <MatchLHS><NegMatchWord><PosMatchingList>
  | Heard<MatchingList>
  | NotHeard<PosMatchingList>
  | Recall<MemList>
  | DontRecall<PosMemList>
  | Chance<chance>
  | (<ConditionClause>[and<ConditionClause>*)
  | (<ConditionClause>[or<ConditionClause>*)
  | (<ConditionClause>[and<ConditionClause>*)
  | (<ConditionClause>[or<ConditionClause>*)
<MatchLHS>=<string>|<memref>|<memref>|<starbufref>
<PosMatchKeyword>=Contains|Matches|
                  ExactlyMatches
<NegMatchKeyword>=DoesNotContain|DoesNotMatch|
                  DoesNotExactlyMatch
```

There are three basic types of condition clause. First, conditions using the match keywords match a particular input pattern, most normally an element of the user memory, such as the string said by the user, to some set of template patterns, which may contain various "macro" characters, such as wildcard characters. Negated matching keywords, such as DoesNotContain, are given their own special category, in order to prevent "double negative" conditions. The Heard and NotHeard keywords are shortcuts equivalent to the commonly used condition "?WhatUserMeant Contains". Second, Recall and DontRecall are used to test whether elements of the user memory have been set or not, and are most commonly used in practice for testing flags that are set by libraries, for instance to indicate the type of question or statement that is being processed. Third, Chance conditions are true or false at random with the given probability. Condition clauses can also be combined using and and or as long as parentheses are used to prevent ambiguity. The curly bracket symbols {} can be used to indicate that a condition is optional.

```
<SingleCondition>=IfHeard<MatchingList>|
                  IfNotHeard<PosMatchingList>|
                  IfRecall<MemList>|
                  IfDontRecall<PosMemList>|
                  IfChance<chance>
```

The single condition objects are equivalent in meaning to the analogous condition objects, except that the If keyword is combined with the condition keyword. In the present implementation, there are also certain cases where single condition objects can be substituted for condition clause objects.

```
<MatchingList>=<MatchingListArg>[[and|&>
                  <Matching ListArg>]*
  |<MatchingListArg>[[and|&]<MatchingListArg>]*
        [[and|&]not<MatchingListArg>]*
  |<MatchingListArg>[[or|,]<MatchingListArg>]*
  <MatchingListArg>=<patlistobj>|(<MatchingList>)
  <PosMatchingList>=<PosMatchingListArg>[[and|&]
                  <PosMatchingListArg>]*
              |<PosMatchingListArg>[[and|&]
              PosMatchingListArg>]*[[and|&] not
              <PosMatchingListArg>]*
              |<PosMatchingListArg>[[or|,]
              <PosMatchingListArg>]*
  <PosMatchingListArg>=<patlistobj>|
              (<PosMatchingList>)
```

A matching list is a list of pattern list objects (single expressions evaluating to lists of strings; see below) separated by and, and not, or or. (The keyword and and the ampersand character (&) are interchangeable, as are the keyword or and the comma.) A matching list serves as the right-hand-side of a matching expression. Parentheses must be used to prevent ambiguity any time a memory reference list contains both and and or. Finally, a positive-only matching list does not allow the use of and not, in order to prevent double negatives such as "DoesNotContain X and not Y".

```
<MemList>=<MemListArg>[[and|&]<MemListArg>]*
              |<MemListArg>[[and|&]<MemListArg>]*[[and|&]
  not MemLisArg>]*
              |<MemListArg>[[or|,]<MemListArg>]*
<MemListArg>=<memref>|(<MemList>)
<PosMemList>=<PosMemListArg>[[and|&]
              <PosMemListArg>]*
              |<PosMemListArg>[[or|,]
              <PosMemListArg>]*
<PosMemListArg>=<memref>|(<PosMemList>)
```

A memory reference list is a list of one or more memory references separated by and, and not, or or. (The keyword and and the ampersand character (&) are interchangeable, as are the keyword or and the comma.) Parentheses must be used to prevent ambiguity any time a memory reference list contains both and and or. Finally, a positive-only memory reference list does not allow the use of and not, in order to prevent double negatives such as "DoesNotContain ?X and not ?Y"

```
<Command>=Say<patlist>;|SayOneOf<patlist>;|
          Do<patlist>;|DoOneOf<patlist>;|
          SaytoConsole<patlist>;|Trace<patlist>;
          Focus<catlist>;|Focus Subjects<string>[, <string>]*;|
          DontFocus;|Suppress<catlist>;|Recover<catlist>;|
          Forget<memlist>;|ForgetOneOf<memlist>;|
          Remember<memlist>;|RememberOneOf<memlist>;|
          Remember<memref>is<patlist>;|
          Remember<memref>IsOneOf<patlist>;|
          Remember<memref>Is Compute<FunctionName>of
                  <patlist>;|
          WaitForResponse;|InterruptSequence;|
          SwitchTo<string>;|SwitchTo<symbol>;|
          SwitchToOneOf<catlist>;|
          Example<patlist>;|InitialExample
                  <integer><patlist>;|
          SequenceExample<exampleindex><patlist>;
<FunctionName>=SpellCheck|URLEncoding|
          ReplacePronouns|
          Capitalize|UpperCase|LowerCase
```

There are currently 26 basic commands. Say makes a statement to the user, while Do takes an action of some sort.

(The possible arguments of a Do action are domain-specific.) SayOneOf and DoOneOf nondeterministically select one of their arguments, and Say or Do that argument. SayToConsole is a Say statement whose output is directed to the console window and log file. Trace is a Say statement whose output is directed to the console window and log file, and only appears when the script is being run in various debugging modes. Remember is used to assign values to associative memory elements; if a list of arguments is given with no is keyword, each argument is assigned an arbitrary non-empty value (currently the string "TRUE".) Remember can also be used to compute a function and assign its value to a memory element; currently implemented functions include spell-checking, URL encoding, pronoun replacement (according to pronoun-replacement pairs defined in Subjectinfo), and several string capitalization operations. Forget is used to un-assign values of associative memory elements. Once Forget ?x has been executed for some element ?x, ?x will have no value and will not cause an IfRecall statement to become true, until a Remember statement is executed for ?x. ForgetOneof, RememberOneOf, and Remember..IsOneOf are the nondeterministic equivalents of Forget, Remember, and Remember..Is, respectively. Suppress takes a list of categories as arguments and suppresses each of its argument categories so that they are no longer executed on any input. Recover takes a list of categories as arguments and reverses the effect of a Suppress command. Focus takes a list of categories as arguments and places them at the front of the ordered category list. Focus Subjects takes a list of subjects as arguments and places all categories which cover at least one of those subjects (as defined with a Subjects command in the top level of the category) at the front of the ordered category list. WaitForResponse halts execution in the same way as a Done statement but resumes at the same point on the next input. InterruptSequence can only be used within a Sequence topic, and temporarily halts execution of the current topic while all of the standard and default topics are executed. When a Done is reached, or when all of the standard and default topics are completed, execution resumes, without waiting for further input, within the Sequence topic. A SwitchTo command immediately transfers control of execution to the named category. A SwitchToOneOf command chooses one of its arguments at random and executes a SwitchTo on it. Example statements do not have any immediate effect, but are used in automatic verification.

<pat>=<string>|<symbol>|<memref>|<starbufref>|<pat>+<pat>

A pattern is anything that evaluates to a string. It can be an explicit string (indicated with quotes), the name of a Pattern object, an associative memory reference, a reference to a "star buffer element" (set according to wildcard characters appearing in template patterns within pattern matching conditional statements), or a concatenation of any of the above.

<patlistobj>=<pat>|<symbol>|(<patlist>)|{<patlist>}|<patlistobj>+<patlistobj>

A patternlist object is any single expression that evaluates to a list of zero or more strings. It can be a single pattern, the name of a PatternList object, a PatternList enclosed in parentheses (also known as an "implicitly defined PatternList" since it is never explicitly given a name), a PatternList enclosed in curly brackets (indicating that the element or elements included within the brackets are "optional"), or a concatenation of any of the above. The value of the concatenation of two lists of strings is a list consisting of the concatenation of each element in the first list with each element of the second list. A symbol is a string of alphanumeric or underscore characters, beginning with a letter. Symbols are not case sensitive.

<patlist>=<patlistobj>[,<patlistobj>]*

A pattern list is anything that evaluates to a list of strings. It consists of one or more PatternList objects, separated by strings. Since each PatternList object may have a value that is a list of strings, the value of the PatternList is the value of all the elements appended together.

<catlist>=<catname>[,<catname>]*
<catname>=<string>|This|<symbol>

A category reference is either an explicit string containing the name of a category, the keyword This (referring to the category in which it appears) or the name of a CategoryList (or TopicList or ScenarioList) object. A category list is simply a list of categories or CategoryList objects separated by commas.

<memref>=?<symbol>|?<pat>:<symbol>
<memlist>=<memref>[,<memref>]*

A reference to the associative memory is normally indicated by a ? followed by the name of the key. Such references are normally particular to the user whose input is being processed. A reference to the associative memory for another user can be made by putting a pattern referring to the other user between the ? and the key. The reference to the other user is separated from the key by a colon. A memory reference list is simply a list of memory references separated by commas.

<starbufref>=
<integer>|*<integer>|%<integer>|&<integer>|*match

The "star buffer" contains the substring of an input string which matched each *, #, %, or & wildcard character in the template pattern in the most recent successful match. References to this star buffer consist of a symbol (*, #, &, or %) followed by a number. *n refers to the substring which matched the Nth * wildcard character found in the template, and so on. *match refers to the substring of the input string that matched the entire template pattern.

<chance>=<realnumber>|<realnumber>%

The argument of a Chance statement is either a real number between 0 and 1, interpreted as a probability, or a real number between 0 and 100 followed by a % sign, interpreted as a probability multiplied by 100.

<exampleindex>=<integer>[.<symbol>]*

The index for a SequenceExample statement is an integer followed by zero or more strings of alphanumeric characters, separated by periods.

The second aspect of the example script programs is that the scripts themselves embody a particular universe of discourse reflective of the subject matter concerning the site itself—e.g. a BOT for a site of a reseller of personal computer should "know" something about computers and their peripherals. These script programs are written in an action-response type style wherein the actual language supplied by the user embodies an "action" to which the "response" is written into the script program itself.

Scripts in the present embodiment are written generally by site administrators (human or otherwise) by defining a list of "categories" in which the site will be well conversant. Categories may comprise "topics" that are recognizable by the runtime executive. Topics, in turn, may comprise patterns or words that are matched against the stream of input communication (in either spoken or written or any other suitable form of communication) from the user.

To embody this knowledge into the runtime executive itself, the script programs are compiled by compiler 107 in FIG. 1. As previously mentioned, these script programs may be iteratively tweaked to improve the interaction with human users by a re-edit and re-compile process. It will be appreciated that compiler techniques sufficient to implement the above-listed BNF language description are well known to those skilled in the art and that the present invention should not be limited to any particular compiler techniques.

B. Runtime Executive Process

Figure 4:
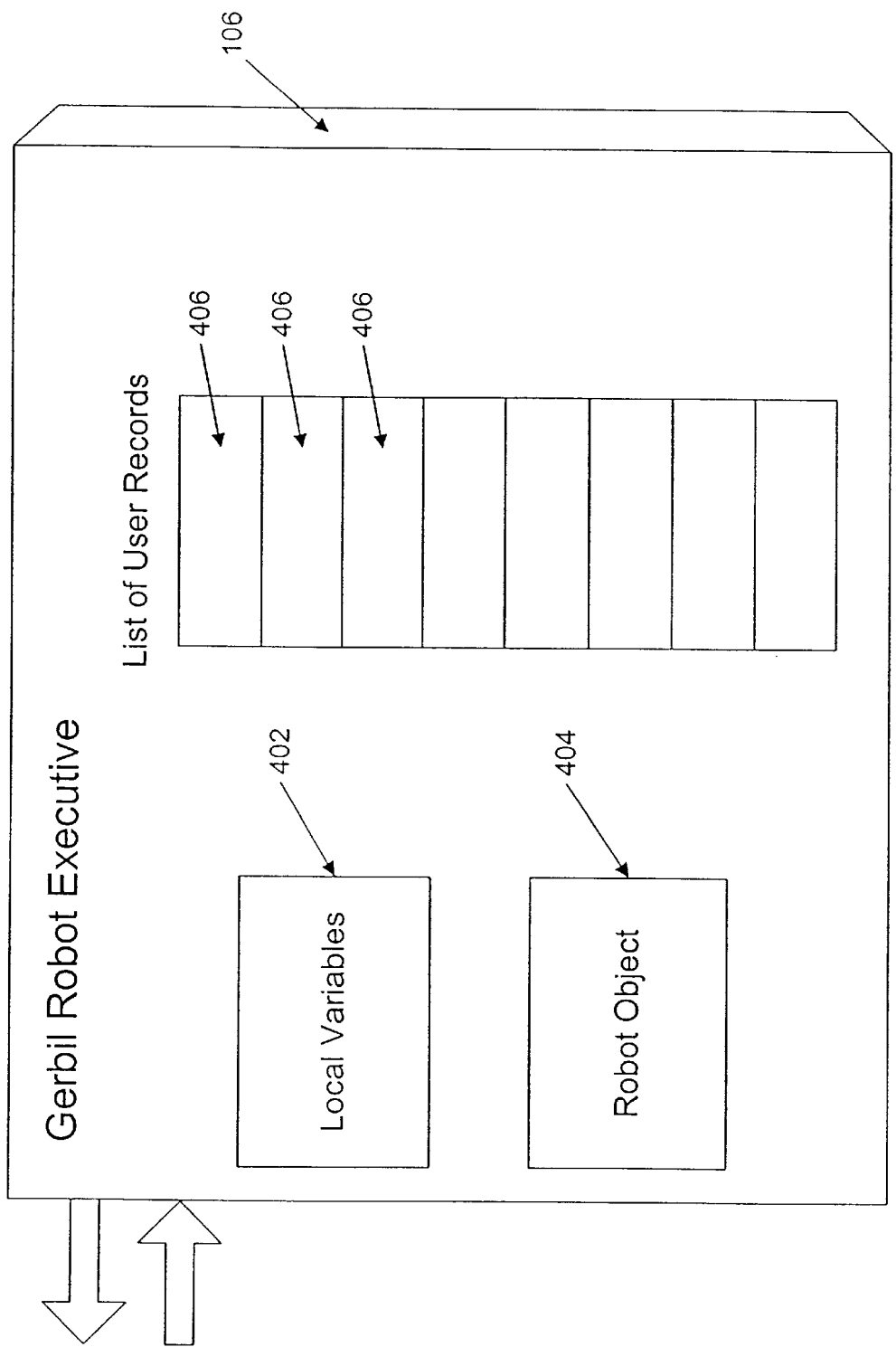
FIG. 4 expands the view of one embodiment of the runtime executive suitable for the purposes of the present invention.

FIG. 4 expands the view of runtime executive 106 of FIG. 1. Runtime executive 106 comprises local variables 402, robot object 404, and a list of user records 406. Robot object 404 is that part of runtime executive 106 that is incorporated by the compilation process described above. Although robot object 404 may be changed via the re-edit and re-compilation process as mentioned, during runtime, robot object 404 typically does not change whilst in conversation with user 116. The list of user records 406 is provided because the BOT processor could be in conversation with multiple users simultaneously and therefore needs to maintain the state of each on-going conversation. The state for each such conversation is maintained in a user record 406. Finally, runtime executive 106 maintains local variables 402 that are used during the processing of a single user input. TABLE 3 is a listing of the C++header file that embodies runtime executive 106.

TABLE 3

C++ HEADER FILE OF RUNTIME EXECUTIVE

```
class CProgram
{
public:
    CExeStruct*              ProgramExecutable;
    CMatcher*                Matcher;
    CBFMatcher*              BFMatcher;
    // holds all short-term run-time data
    CRunStruct*              RunTime;
    CGRBLToolDoc*            OwnerSession;
    FILE*                    m_pfRSP;
    CString                  CurrentInputString;
    // Registered attributes
    CTypedPtrMap<CMapStringToPtr, CString, CAttributeInfo*>
            *m_pmspAttributeRegistry;
    // Subject information
    CTypedPtrMap<CMapStringToPtr, CString, CSubjectInfo*>
            *m_pmspSubjectInfo;
    // User records now indexed by ID (SSB 12/17/96); we keep
    // around a map by name which is used only for reading
    // from logs. Each element is a CUserRec*
    CMapPtrToPtr       UserRecords;
    // Index names should now be all-lower-case, SSB 2/3/97
    // NOTE: Only use this when reading log files!
    CMapStringToPtr                  UserRecordsByName;
    // Users that used to exist but have been destroyed. This might
    // actually contain IDs that are also in UserRecords since they
    // could have been recreated. The target elements of this map
    // are always NULL.
    CMapPtrToPtr       IdleTimeOutUsers;
    CMapPtrToPtr       TalkTimeOutUsers;
    // Number of users that are logged in. This is different from
    // UserRecords.GetSize() because (a) it doesn't include the robot,
    // console user, or test user, and (b) entries in the user record
    // map may point to NULL for users that have been deleted.
    int                              UserCount;
    // A user rec, in order to store things for the robot.
    // Actually, this has a lot of excess information,
    // such as an Attention Stack.
    // This rec may also (eventually) be in the general
    // user-list.
    // Added SSB 2/3/97
    CUserRec*                        RobotRec;
    // Shortcut to a special user used for testing; this user is in
    // the general user records list as well.
    CUserRec*                        TestUser;
    // Run-time options
    BOOL                             TraceOn;
    BOOL                             FullTraceOn;
    BOOL                             EchoOn;
    CategoryExecutionMode            ExecutionMode;
    // TestMode TRUE indicates that user state is saved in order to go back
and
    // retreive further categories that were activated by an execution. (This
also
    // happens if ExecutionMode is EqualMatches or AllMatches.)
    // Used for Example mode and other debugging modes.
    BOOL                             TestMode;
    BOOL                             BEST_FIT_DEBUG;
// whether it says anything when example answer is right
    BOOL                             CorrectExampleTrace;
```

TABLE 3-continued

C++ HEADER FILE OF RUNTIME EXECUTIVE

```
// so we don't try to send out to clients.
    BOOL                         ReplayingLog;
    // in order to have output and report messages echoed to a report file,
    // set Reporting to TRUE and set m_strReportFileName.
    // will cause output to be printed to m_strReportFileName.
    BOOL                         Reporting;
CString                          m_strReportFileName;
    // Values for keeping statistics during Example testing
    int                          nExamplesRun;
    // correct answer not given, maybe others given
    int                          nWrongAnswers;
    int                          nlExtraAnswers;
    // Run is bound to a particular session doc and view, and executes
    // either Topics or Scenarios. If TestMode is on, produces no
    // direct output.
    void Run(    CGRBLToolDoc*    ThisDoc,
                 CGRBLToolView*   ThisView,
                 LPCTSTR          TextLine,
                 LPCTSTR          UserName,
                 ULONG            UserID,
                 ULONG            ProtocolMessageType);
    // Runs all examples in a file or program.
    void RunAllExamples(  CGRBLToolDoc*    Context,
                 LPCTSTR          InputFileName,
                 LPCTSTR          ReportFileName,
                 BOOL             bFindAllMatches,
                 BOOL             bEchoOn,
                 BOOL             bPrintAll,
                 BOOL             bTraceOn);
    void RunSequenceExample(CSequenceExample* ThisExample,
                 CUserRec*        ExampleUser,
                 CGRBLToolDoc*    Context,
                 CGRBLToolView*   pSessionView);
    void RunExampleSet( CExample*  ThisExample,
                 CUserRec*        ExampleUser,
                 CGRBLToolDoc*    Context,
                 CGRBLToolView*   pSessionView);
    void RunExampleInput( LPCTSTR  ExampleText,
                 CExample*        ThisExample,
                 CUserRec*        ExampleUser,
                 CGRBLToolDoc*    Context,
                 CGRBLToolView*   pSessionView);
    // Functions to summarize all the examples in the hot
    void SummarizeExamples(LPCTSTR FileName);
    void SummarizeExample(CExample* ThisExample, FILE* f);
    // Runs an attribute check
    void RunAttributeCheck(LPCTSTR InputText);
    // Performs "intelligent find-in-files"
    void LookForCategories(LPCTSTR InputList, int NumCategories, int
Flags);
    CSearchPattern* ConvertPatternToSearchPattern(CString Pattern, BOOL
Subword);
    // function which fetches the next category to be executed
    CCategory* GetNextCategory( CGRBLToolDoc* Context,
                       CUserRec* ThisUser,
                       CCatType ExecutionType,
                       CABlockEnd LastReturnVal);
    // Output interface between the Bot and the Connector. This now
    // outputs only to the robot, not to the console. The output message,
    // annotated with "Robot says", etc., are put in RunTime
>RobotOutputSummary
    void RobotOutput(LPCTSTR TextLine,
                       ULONG ThisUseriD,
                       ULONG MsgType);
    // Wrapper which uses the RunTime SayBuffer if needed
    void BufferedSay(LPCTSTR TextLine,
                       ULONG ThisUseriD,
                       ULONG MsgType,
                       BOOL IsBuffered,
                       CArgListElem* ItemSaid);
    // produces appropriate trace messages for example mode.
    void HandleOutputInExampleMode(CAction*  Action,
                          CArgListElem*   OutputItem);
    // Output a line to the console. ALL output or potential output to
    // the console and/or log or report files should go through this function.
    void ConsoleOutput(OutputLineType MessageType,
                       LPCTSTR Message,
```

TABLE 3-continued

C++ HEADER FILE OF RUNTIME EXECUTIVE

```
                            LPCTSTR SourceFile,
                            int SourceLine);
    void ConsoleOutput(OutputLineType MessageType,
                            LPCTSTR Message);
    void ConsoleOutput(OutputLineType MessageType,
                            CConsoleData* MessageData);
// pushes output to the console
    void PushConsoleOutput(ConsoleOutputType OutputType);
    void ClearConsoleOutput();
    void PushConsoleOutputToString(ConsoleOutputType OutputType,
                            CString&
OutputString);
    // version which bypasses all buffers and just prints it out.
    void DirectConsoleOutput(OutputLineType MessageType,
                            LPCTSTR Message,
                            LPCTSTR SourceFile,
                            int SoruceLine);
    void DirectConsoleOutput(OutputLineType MessageType,
                            LPCTSTR Message);
    void DirectConsoleOutput(OutputLineType MessageType,
                            CConsoleData* MessageData);
    // Creation of a new user
    CUserRec* CreateNewUser(ULONG UserID, LPCTSTR UserName);
    BOOL DestroyUser(ULONG UserID);
    // Reset user to initial state (of memory and attention stack)
    void RestartUser(CUserRec* ThisUser);
    // Returns TRUE iff the given user used to exist and does not now.
    // Returns FALSE if the user still exists or never existed
    BOOL UserTalkTimeOut(ULONG UserID);
    BOOL UserIdleTimeOut(ULONG UserID);
    // if there is a slot open, returns TRUE.
    // otherwise, if any users have been on too long, deletes the
    // oldest one and returns TRUE, otherwise returns FALSE.
    BOOL FindUserSlot();
    // reset the name
    BOOL ChangeUserName(ULONG UserID, LPCTSTR NewName);
    // Finding of a user by ID
    CUserRec* FindUser(ULONG UserID);
    // And by name - only use this when replaying log files
    CUserRec* FindUserByName(LPCTSTR UserName);
    // Special functions are declared here. . .
    void DumpMemory(ULONG    ID);
    void PrintCurrentFocus(CUserRec* User, BOOL ShortPrint);
    // Prime the random number generator for this thread
    void PrimeTheRNG();
    // Handle the refocusing component of the program execution
    void Refocus();
    // Continuation help functions
    void SetupContinuation(CGRBLToolDoc* Context, CUserRec* ThisUser,
CContinuation* ThisContinuation);
    // Functions to Remember and Forget automatically-defined
    // attributes for the current user.
    void SetUserAttribute(LPCTSTR Key, LPCTSTR Value);
    void UnsetUserAttribute(LPCTSTR Key);
    // Automatic pronoun replacement
    BOOL ReplacePronouns(CString OriginalText, CString& FinalText);
    // Intelligent Tracing Functions
    void AddConditionTraceData(LPCTSTR Message,
                            LPCTSTR SrcFileName, int SrcLine);
    void EnterIfFrame();
    nvoid EnterSwitchErame(LPCTSTR Message, LPCTSTR SrcFileName,
                            int SrcLine);
    void ExitIfFrame();
    void ExitSwitchErame(LPCTSTR Message, LPCTSTR SrcFileName,
                            int SrcLine);
    void ExitAllFrames();
    void AddTraceMsg(LPCTSTR Message, LPCTSTR SrcFileName,
                            int SrcLine, BOOL FullTraceOnly);
    void ActivateTrace(); // equivalent to a null trace message
    void ActivateExampleTrace(); // version for Examples mode.
    void ReplayTrace(BOOL FullTrace);
    int GetSize();
    void PrintSize();
    CProgram(CGRBLToolDoc* pgtd);
    ~CProgram();
    };
```

Figure 5:
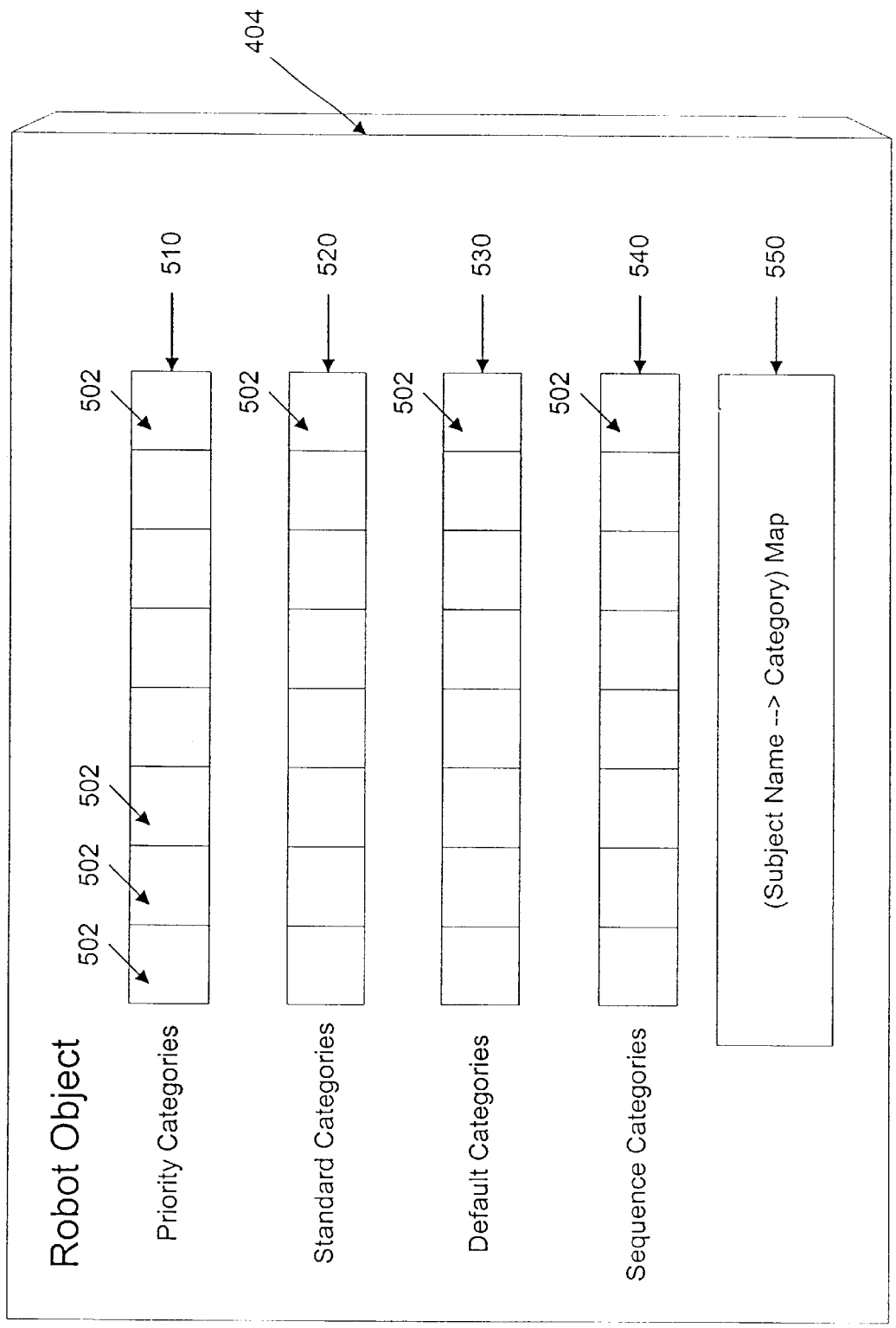
FIG. 5 expands the view of an embodiment of the robot object suitable for the purposes of the present invention.

In the code given in Table 3, robot object 404 corresponds to ProgramExecutable, which is of type CExeStruct. FIG. 5 expands the view of robot object 404 as shown in FIG. 4. Robot object 404 comprises several types of categories. These categories inherently maintain a priority by which runtime executive 106 processes inputs. For example, in FIG. 5, four types of categories are depicted: priority categories 510, standard categories 520, default categories 530, and sequence categories 540. When an input comes into the BOT processor, the input is processed through a series of categories. First, the priority categories are processed to determine whether there is a response that will be generated by the current input. These priority categories are processed, in the present embodiment, in the order in which they appear in the runtime executive. This order is currently selected in turn by the actual order in which PRIORITY TOPICS are found in the script program. This processing continues through the standard and default categories. Standard categories are executed according to the mechanism disclosed in the below-incorporated-by-reference patent application by Tackett et al. Default categories are executed in the actual order in which DEFAULT TOPICS are found in the script program. Sequence categories 540 are also included in the robot object 404 but are not executed unless explicitly executed by a SWITCH-TO statement as described below. In the present embodiment, sequence categories are typically employed to perform a number of pre-defined sequential communications with a user to effect a desired result. For example, having the BOT take an order for tickets to an event, how many such tickets, credit card information to purchase such tickets, etc. is readily implemented as a sequence category. Such a sequence category would be SWITCHed-TO if prompted by a user inquiry to buy tickets. It will be appreciated that other hierarchies of categories may be defined and order of execution selected. It suffices for the purposes of the present invention that some hierarchy of categories is defined and that the best fit mechanism as disclosed below be employed using one or more of such categories.

FIG. 5 also contains subject-name to category map 550, which describes the categories associated with each subject found in a SUBJECTS command in one or more categories. This map helps to implement the Focus Subjects command and automatic focus mechanism, as described below.

Figure 6:
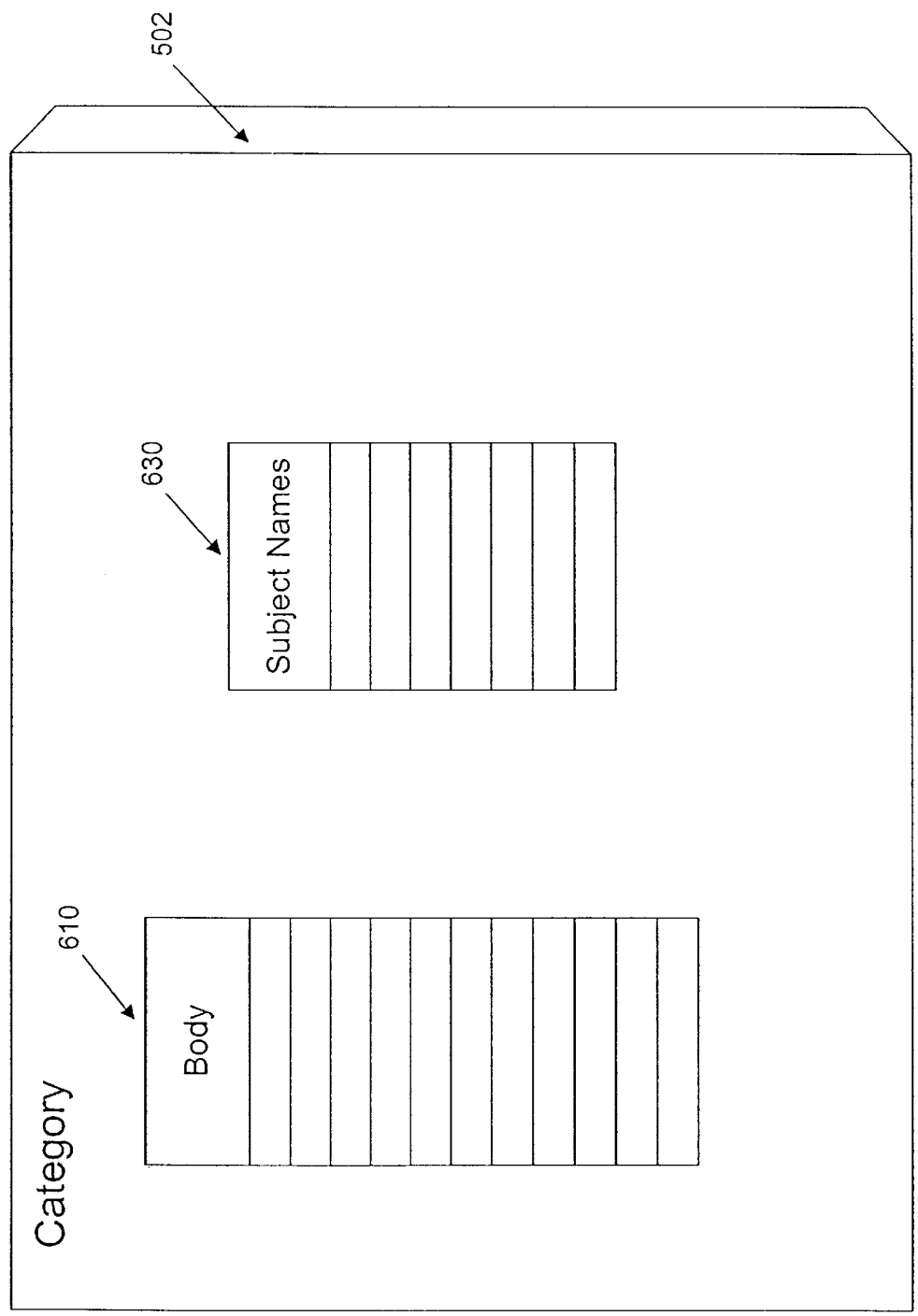
FIG. 6 describes the content of a category as embodied in a robot object.

FIG. 6 describes the content of a category 502. Category 502 comprises body 610 and subject names 630. Body 610 is a list of pointers to condition-action blocks. Such a condition-action block is a representation of an IF-THEN block found a script program. Subject names 630 are a representation of a listing of SUBJECTS that may optionally be found in a script program. As will be discussed in greater detail below, subject names 630 are used to focus the attention of the BOT processor on other categories similar to the category being processed.

Figure 7:
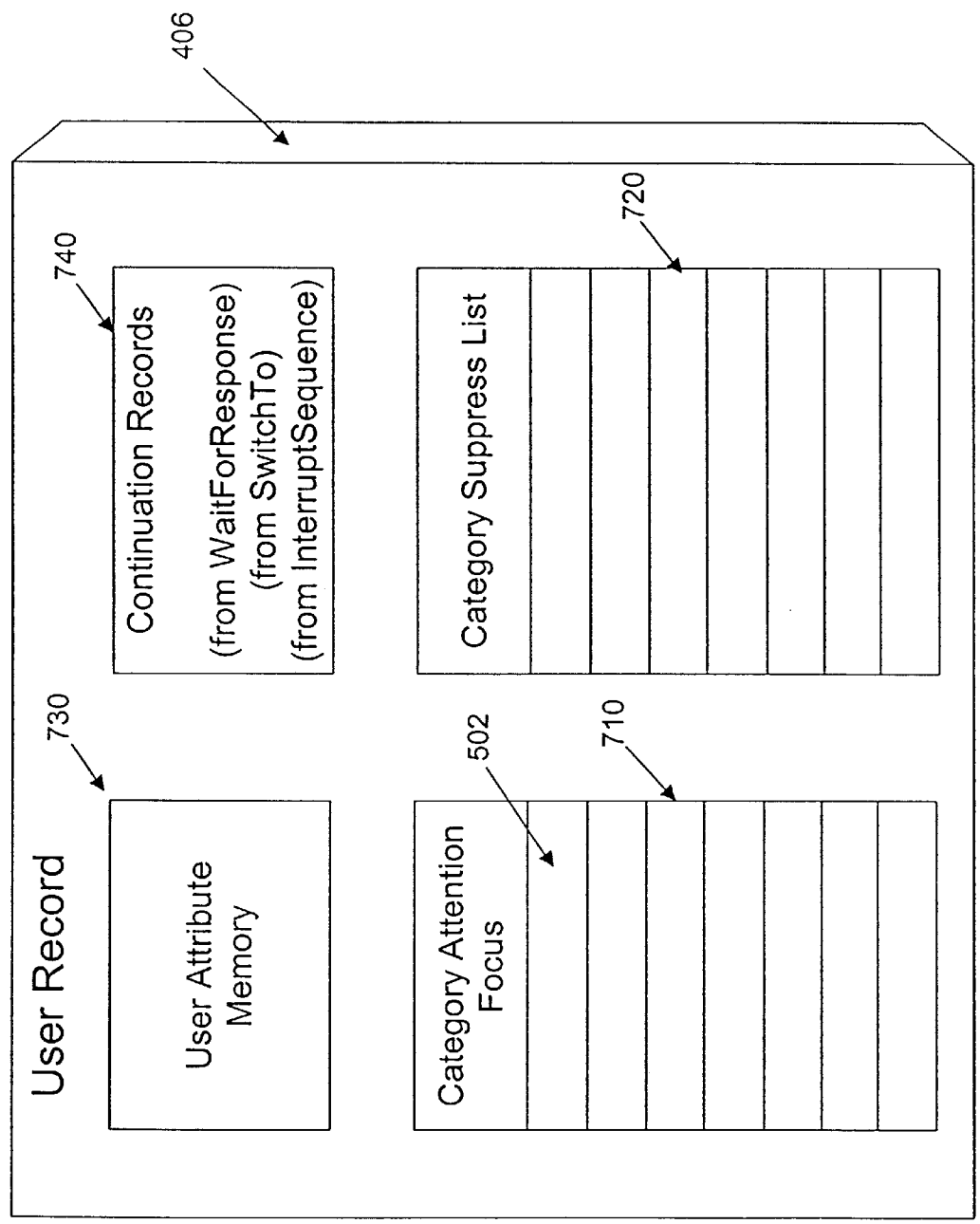
FIG. 7 expands the view of user record as shown in FIG. 4.

FIG. 7 expands the view of user record 406 as shown in FIG. 4. User record 406 comprises category attention focus list 710, category suppress list 720, user attribute memory 730, and continuation records 740. In the current embodiment of the present invention, attention focus list 710 is an ordered list comprising the standard categories 520 found in robot object 404. More generally speaking, however, an attention focus list could be implemented as a much broader list of any number of categories, as opposed to any single type of category. Indeed, for the purposes of the present invention, an attention focus list is an ordering of categories that, by virtue of their ordering, may affect the execution of an automatic interface program (i.e. BOT). It will be appreciated that all the "lists" and other structures mentioned herein could be implemented in a wide variety of well known data structuring techniques. For example, in the present embodiment, lists are implemented as CTypedPtrLists, however, lists can be readily implemented in hash tables, arrays, linked lists, or other known methods. Thus, the scope of the present invention should not be limited to specific data structure and algorithm techniques and should include all well known design and implementation variants.

The ordering of categories within the attention focus list 710 may be different for different users and reflects the state of the BOT processor's conversation with the particular user. The categories at the top of the list 710 represent areas of discourse in which the BOT processor is currently focused. In the present embodiment, when a new user begins communications with the BOT processor, the attention focus list 710 for that new user corresponds exactly to the standard categories list 520—which in turn corresponds to the order in which TOPICS are found in the script program. As conversation between the user and the BOT processor continues, this ordering of categories in attention focus list 710 is reordered according to the topics discussed by the user.

Category suppress list 720 is a list of categories that have been suppressed explicitly in the script program. Suppression of categories can occur a number of ways: suppressed categories may be initially listed as suppressed in the script program or categories may be subsequently suppressed by execution of a particular action in a script program. If the user touches upon a suppressed topic, then the suppressed category is not executed by the BOT processor. This suppress feature allows the BOT creator to have greater control over the BOT's "personality" as presented to the user.

User attribute memory 730 allows the BOT processor to remember certain attributes of the user that it has learned during the course of the conversation. For example, the gender, the telephone number, the credit card number, the address of the user may be particular fields found in user attribute memory 730.

Continuation records 740 are used primarily when the BOT processor has interrupted the execution of a category and may eventually wish to resume execution of said category. Such interruptions can occur as a result of a WaitForResponse statement (in which case the BOT processor has made a query of the user and is awaiting a response), an InterruptSequence statement (in which case the BOT processor has temporarily halted processing of the current category), or a SwitchTo statement (in which case the BOT processor may eventually return to the category containing the SwitchTo statement after executing a Switch-Back command.) At such a point, continuation record 740 maintains the location of the execution of the script in memory. Once the interruption is complete, execution continues at such location. It will be appreciated that there are other times in which it is desired to store such execution state.

Figure 8:
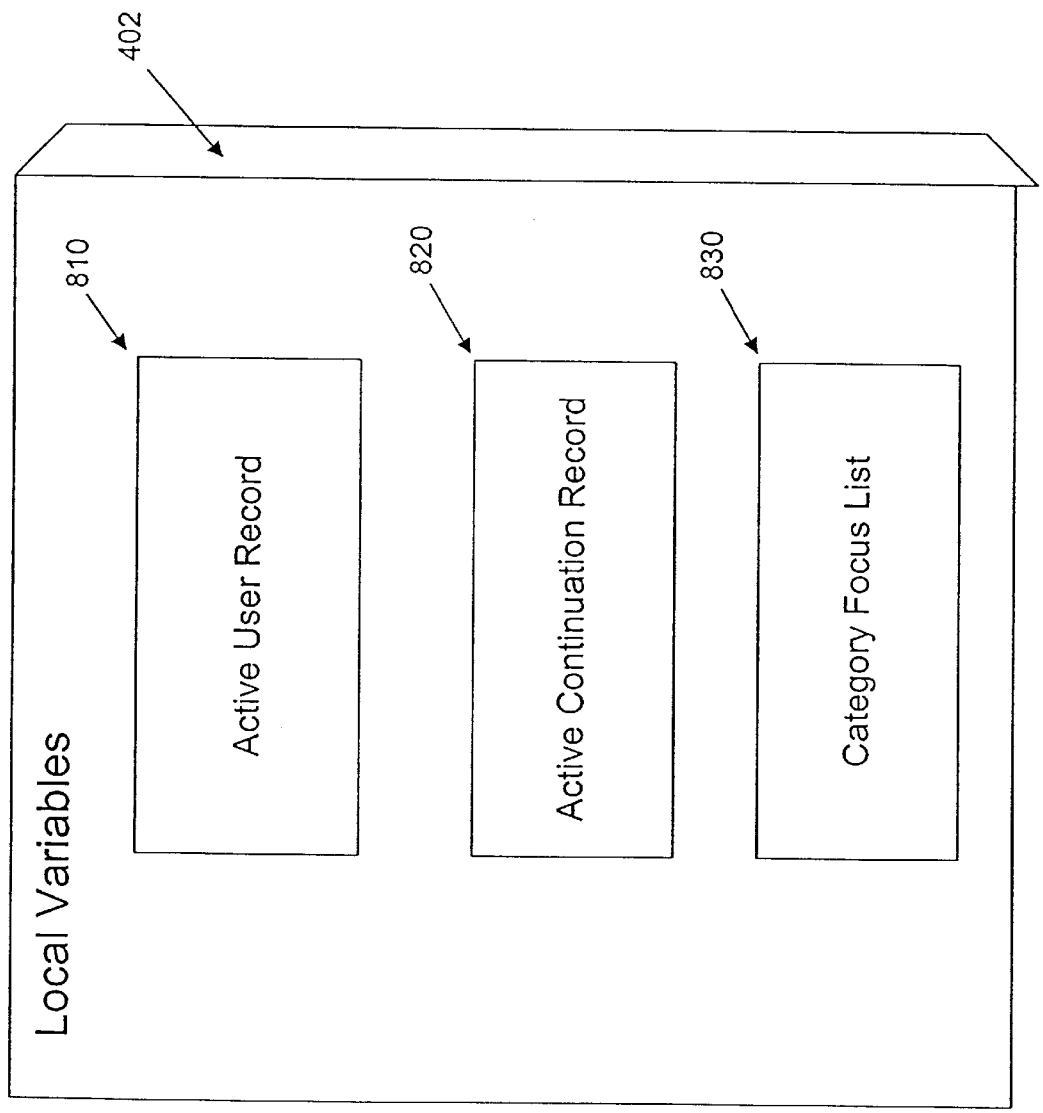
FIG. 8 expands the view of local variables as found in FIG. 4.

FIG. 8 expands the view of local variables 402 as found in FIG. 4. Local variables 402 comprise active user record 810, active continuation record 820, and category focus list 830. Active user record 810 is the user record 406 that corresponds to the user that is currently talking to the BOT processor. Active continuation record 820 is one of the continuation records 740, if any, that is copied over for the current execution. Category focus list 830 provides an intermediate store of recently activated categories and other categories associated with them. Categories are associated if they share at least one subject name as listed in 630 in FIG. 6.

III. Execution of Gerbil Programs
A. The Internal Structure of a Gerbil Program

Now a more detailed explanation of both the structure and the execution of Gerbil programs in the present embodiment will be given. There are three relevant member variables of the present embodiment of a Gerbil program (CProgram):

| | |
|---|---|
| CExeStruct* | ExeProg; |
| CRunStruct* | RunTime; |
| CMapPtrToPtr | UserRecords; |

The ExeProg contains an executable version of the Gerbil script. The RunTime structure contains variables that are used when executing the Gerbil script. The list of User-Records (stored as a map from UserIDs to CUserRec structures) contains information specific to the state of the conversation with each user, such as any facts remembered about that user and the focus of attention for that conversation.

The CExeStruct contains the following relevant member variables:

| | |
|---|---|
| CCategoryList | PriorityCategories; |
| CCategoryList | DefaultCategories; |
| CCategoryList | SequenceCategories; |
| CCategoryList | StandardCategories; |
| CMapStringToPtr | m_pmspSubjectMap; |

Each CCategoryList contains a list of CCategory objects. Each CCategory contains a set of CConditionActionBlock objects, each with a condition and a list of CAction objects. A CConditionActionBlock is a type of CAction, so CConditionActionBlock objects can recursively contain other CConditionActionBlock objects. A CCategory also contains a list of all the subjects discussed by the category.

The lists PriorityCategories, DefaultCategories, and SequenceCategories are fixed in ordering and are shared among all users. Each user record contains a copy of the list StandardCategories (see below) in which the ordering of categories can dynamically change (according to the focus mechanism). The copy of StandardCategories in the CExeStruct is fixed in order and is used to create the initial copy of StandardCategories for each new user. Finally, the CExeStruct contains a map m_pmspSubjectMap from each subject name to the list of categories that discuss that subject In the present embodiment, the CRunStruct contains two relevant member variables:

| | |
|---|---|
| CUserRec* | User |
| CTypedPtrList<CObList, CCategory*>FocusList; | |

It also contains a number of temporary pointer variables, including Continuation, ActiveCatPos, and SwitchToCategory, which are used in execution as described below. User is a pointer to the user record for the user involved in the current conversation. FocusList is used to store the list of categories that have been activated by the focus of attention mechanism during the current execution of the Gerbil script. It will be used at the end of the run to modify the focus of attention for the current user, as described below.

The CUserRec contains information about the current user and the robot's conversation with the user. In particular, it contains a CMapStringToPtr containing the contents of the memory for the user, in which each attribute name is mapped to a list of strings representing the value of that attribute, and six member variables relevant to the present mechanisms:

| | |
|---|---|
| CCategoryList | AttentionFocus; |
| CTypedPtrList<CObList, CCategory*> | SuppressList; |
| CContinuation* | Continuation; |
| CTypedPtrList<CObList, CContinuation*> | SwitchContinuations; |
| CTypedPtrList<CObList, CContinuation*> | SequenceContinuations; |
| CMapStringToString | m_mssReplacements; |

AttentionFocus is a copy of the StandardCategories list from the program executable that describes the attention focus for the BOT's conversation with the current user. The order of the categories in this list may be different than the order in StandardCategories, due to the functioning of the focus mechanism. SuppressList is a list of pointers to the categories that are suppressed in the robot's conversation with the current user. SuppressList may include categories from the PriorityCategories, DefaultCategories, and StandardCategories list. m_mssReplacements is a mapping from certain words to other words, used in implementation of the pronoun replacement mechanism disclosed below. Next, Continuation is NULL unless there is a WaitForResponse command that is currently active. In this case, Continuation points to a CContinuation structure that describes where in the script the WaitForResponse is located and how to resume execution from that point. Finally, the user record contains stacks of continuations that handle interruptions of a Sequence category and switches back from Sequence categories. SwitchContinuations contains a CContinuation for each SwitchTo statement for which a SwitchBack is still possible (much like the call stack in other programming languages), while SequenceContinuations contains a CContinuation for each sequence that has been interrupted by an InterruptSequence command and not yet returned. The functioning of these CContinuation stacks is described further below.

B. The Exectution of a Gerbil Program

One main feature of a Gerbil program is its ability to "focus" categories for the express purpose of being more responsive to user communication. The "focusing" of categories, for the purposes of the present invention, is implemented by a combination of explicit and automatic methods. Explicit focusing can be accomplished in one of two ways in the current embodiment. The first focus mechanism, the "Focus" command, is added to the script program to explicitly focus a particular category when the command is executed. As will be explained below, "focusing" in the current embodiment moves the focused category to the front of the attention focus list. Thus, during the course of execution, the runtime executive will generally check the newly focused category earlier than it would have had the category not been focused. As an example, a sample Focus command might look like—Focus "dogs", "cats";—this command would move the category "dogs" to the front of the attention focus list and the category "cats" immediately following it. The Focus command is useful to make certain categories more immediate in the course of conversation and, in particular as to the above example, if the user had recently spoken of "pets".

The second explicit focus mechanism, the "Focus Subjects" command, is similar to the "Focus" command but differs in that it will move a set of unspecified categories, each said category sharing a Subject whereby the Subject is explicitly listed within a "Subjects" command within the category. For example, in scripts example 2 above, the command—Focus Subjects "6SC";—could be placed in any category and if said command is executed, then all categories explicitly listing "6SC" (i.e. in example 2, these categories are: "Price of 6SC", "Size of 6SC", and "Maker of 6SC") will be placed to the front of the attention focus list. This command is useful to focus related categories without having to explicitly list them all.

In addition to these explicit focus mechanisms, there is an automatic focus mechanism that works without use of explicit commands. If a category is activated by matching an input pattern with a pattern made explicit in a category, or by matching a value of a user memory element with a pattern made explicit in a category, or by executing a statement within the category, then that category is moved to the front of the attention focus list. Additionally, in the current embodiment, if that category contains a Subjects command, then all other categories which share at least one of the arguments of the Subject command are also moved to the front of the attention focus list. It will be appreciated that other protocols could be observed upon automatic focusing of a category.

Another, somewhat related mechanism, "Suppress", is implemented in the current embodiment. "Suppress" is an explicit command that disables the activation of the categories named in the command for the remainder of the course of conversation with that user. Such categories can be placed back into consideration with the use of the "Recover" command. For example, the command—Suppress "dogs";—will suppress the category "dogs" from further discussion, even if an explicit Focus command would purport to move it to the front of the attention focus list.

Now a more detailed description of the current embodiment will be discussed. During execution, each Gerbil command in the present embodiment actually returns a CABlockEnd value that describes what the program should do following the command. This value is normally Continue, indicating that the program should continue by executing the next Gerbil command. It can also be one of the values Waiting, Done, NextCategory, Switch, SwitchBack, NotActivated, or RunTimeError. (The Done, Continue, and NextTopic "terminators" that appear at the end of a condition block in a Gerbil code are actually implemented as commands that do nothing other than return the appropriate CABlockEnd value.) In this context, the following is a discussion concerning six Gerbil commands that are relevant to the focus of attention mechanism: Focus, Focus Subjects, WaitForResponse, TryAgain, InterruptSequence, and SwitchTo.

Each Focus command in a Gerbil script has as arguments a list of categories. This list is converted by the compiler into a list of pointers to the actual categories. When the Focus command is executed, these pointers are copied to the end of the RunTime->FocusList structure (to later be brought to the front of the attention focus list.) The C++code for CFocus::Execute is straightforward and is shown below.

```
POSITION pos = ArgValues.GetHeadPosition();
for(;pos !=NULL;){
    ArgCategory=(ArgValues.GetA(pos))->Category;
    ArgValues.GetNext(pos);
    if(ArgCategory !=NULL){
        TRACE("Putting Category\"%s\" on focus list\n",
            ArgCategory->Name);
```

```
        Context->m_ppProgram->Runtime->FocusList.AddTail(
            ArgCategory);
    }
}
return Continue;
```

In order to execute a "Focus Subjects" command, the robot executive takes each argument and uses the map m_pmspSubjectMap found in the CExeStruct to determine which categories share that subject. Each of the categories contained in the m_pmspSubjectMap under the subject name is appended to the end of RunTime->FocusList.

The WaitForResponse command causes execution on the current input to stop, but before that, sets up a CContinuation telling the Gerbil program where to restart when the next input is processed. This CContinuation is created by the compiler and stored in the CWaitForResponse statement. The code for CWaitForResponse::Execute is trivial; it simply copies the CContinuation pointer into RunTime->User->Continuation and returns Waiting.

A TryAgain command is simply a special case of WaitForResponse in which the CContinuation starts from the previous WaitForResponse rather than the TryAgain command. A TryAgain command is converted into an appropriate CWaitForResponse by the compiler.

An InterruptSequence command can only be used within a Sequence category, and causes the execution of the category to be suspended while all of the standard and default categories are executed. (InterruptSequence can only be used after a WaitForResponse, to prevent possible conflicts in which a category might be executed twice.) It is implemented by adding a CContinuation to the top of the SequenceContinuations stack (allowing nested interruptions within interruptions) and returning the value NextCategory.

Each SwitchTo command in a Gerbil script has the name of a single category as an argument. Again, this category name is converted into a pointer by the compiler. When the SwitchTo command is executed at run-time, this pointer is copied into a member variable RunTime->SwitchToCategory and the value Switch is returned. Furthermore, a CContinuation representing the SwitchTo is copied into User->SwitchContinuations so that the category can be resumed if the target category ends with a SwitchBack. The fact that User->SwitchContinuations is a stack allows arbitrarily deep series of SwitchTo and SwitchBack calls.

In order to prevent cycles in which a category in the attention list is repeatedly executed and then SwitchedTo from another category later in the attention list, the present embodiment of the program checks to make sure that the category has not already been executed before returning any value. If it has already been executed, the value RunTimeError is returned instead. Such cycles can only occur with standard categories. The compiler will check all sequence categories and guarantee that cycles among them will not occur. This is done by viewing each category as a node in a graph and each SwitchTo as an arc, and doing depth-first search to detect cycles in the graph. A WaitForResponse before the SwitchTo eliminates the arc caused by that SwitchTo, as it will prevent cycles from occurring while processing a single input. The C++ code for CSwitchTo::Execute is shown below. The SwitchToOneOf command is a straightforward extension of SwitchTo.

```
        CCategory*DestCategory = Destinations[selection]->Category;
        ASSERT(DestCategory != NULL);
        if((DestCategory->Executed) && (DestCategory->Priority !=
SequencePriority))
{
        //run-time error to switch to an already-executed non-sequence
category
        Context->m_ppProgram->PrintTraceMsg("ERROR",
SrcFileName
                                        SrcLine);
        return RunTimeError;
}
//record what category is being switched to in the run-time data structure
Context->m_ppProgram->RunTime->SwitchToCategory = DestCategory;
//and remember where it was called from
Context->m_ppProgram->RunTime->User->SwitchContinuations.
        AddHead(m_pccCallingLocation);
returnSwitch;
```

The next level of structure above single commands in a Gerbil script is a CConditionActionBlock. A CConditionActionBlock consists of a condition and a body consisting of a list of commands. When the CConditionActionBlock is executed, the condition is first evaluated. If it is false, the block returns NotActivated immediately. Otherwise, the body statements are executed in order (normally starting with the first statement, but starting with a later statement if the block is part of an active Continuation) until one returns a CABlockEnd value other than Continue. When some other CABlockEnd value is returned, it is passed on as the return value of the CConditionActionBlock.

A CCategory contains an ordered list of CConditionActionBlock objects, and is executed by executing the blocks in succession (normally starting with the first block, but starting with a later block if the CCategory is part of an active Continuation.) If a block returns the value NextCategory, Switch, SwitchBack, Waiting, Done, or RunTimeError, execution of the CCategory stops and the return value is passed on. If a block returns NotActivated, the next block is executed. If a block returns Continue, the next block is activated unless it is an Otherwise block or unless both the current and next blocks are IfChance blocks, in which case it and all other IfChance blocks immediately following it are skipped. If the last block in the category returns Continue or NotActivated, execution of the category is complete and the value NextCategory is returned. Meanwhile, if the category is a standard category, any output command (currently all variants of "Say" or "Do") will cause a flag to be set in the category. If this flag is set at the end of CCategory::Run, the category is appended to the end of RunTime->FocusList so that it will be automatically moved to the front of the focus of attention list. This automatic focus allows the attention focus mechanism to function even without the use of Focus statements. It will be appreciated that other implementations might decide whether a topic should be automatically focused in a different way, for example by automatically focusing on any topic in which the condition in at least one CConditionActionBlock has value true, or any topic in which any action is executed.

This behavior can be overridden by including the command DontFocus in any of the blocks that should not trigger the automatic focus mechanism. Furthermore, if the category is given a list of SUBJECTS in the Gerbil script, when the category is focused using automatic focus, all other categories that share at least one SUBJECT with said category are also appended to the end of RunTime-> FocusList and will be automatically moved to the front of the focus of attention list.

When a user enters an input, the function CProgram::Run is called. This function does a number of low-level tasks (such as setting RunTime->User) and then executes the Gerbil program. First, it clears FocusList so that it can keep track of categories that are focused on during the execution. To prevent possible ambiguities in the ordering of category executions, Focusing actions do not have any effect until the script is finished executing on the current input. It will be appreciated that other implementations of an attention focus mechanism might dynamically reorder the attention focus list during the processing of an input.

The CProgram is executed by repeatedly selecting and executing categories, as shown in the code fragment below from CProgram::Run. RunTime->ActivePriority and RunTime->ActiveCatPos are used to keep track of what category is currently being executed. Once execution is complete, RunTime->FocusList is used to move those categories that were activated or focused on during execution to the front of the Focus of Attention, focusing the robot's attention on these categories. The function CProgram::Refocus itself is straightforward, simply going through RunTime->FocusList, and for each element, removing it from its previous position in the attention focus list and placing it at the front of the list.

```
//mark all categories as un-executed
ThisUser->AttentionFocus.MarkUndone();
ProgramExecutable->PriorityCategories.MarkUndone();
ProgramExecutable->DefaultCategories.MarkUndone();
ProgramExecutable->SequenceCategories.MarkUndone();
//Clean up focus list and do a bunch of other initialization tasks
RunTime->InitializeForRun();
//Execute all of the categories; in order.
CABlockEnd ReturnVal = NextCategory;
CCategory* ActiveCategory = GetNextCategory(ThisDoc, ThisUser,
                                ExecutionType, ReturnVal);
while(ActiveCategory != NULL){
        ReturnVal = ActiveCategory->Run(ThisDoc);
        ActiveCategory = GetNextCategory(ThisDoc, ThisUser,
                                ExecutionType, ReturnVal);
}
//(other tasks done here such as handling output buffers)
//handle all focusing actions
Refocus();
```

Most of the work involved in deciding which categories to execute is done inside of CProgram::GetNextCategory. GetNextCategory uses RunTime->ActivePriority, RunTime-> ActiveCatPos, and the ReturnVal from the previous category, and selects the next category to execute. If ReturnVal is NextCategory, the program will simply select the next category from the CategoryList for the current ActivePriority (Priority, Standard, or Default), according to the selection mechanism operative for that category and switching to the next priority level if necessary. (Recall that the Priority and Default categories are found in the CExeStruct, while the standard categories are found in RunTime->User-> AttentionFocus. Sequence categories are never executed unless activated with a SwitchTo command, so the list ExeProg-> SequenceCategories is never executed directly.) If there is an active CContinuation remaining from a previous execution (due to a WaitForResponse), it is activated immediately after the Priority categories. CContinuations are activated by returning the appropriate category and setting RunTime-> Continuation, which will cause execution of the category to begin at the appropriate place within the category rather than the beginning.

If ReturnVal is Switch, the target category (from RunTime->SwitchToCategory) is selected, and if the target category is a Standard category, RunTime->ActiveCatPos is set as well. If ReturnVal is SwitchBack, the first CContinuation from SwitchContinuations is removed from the stack and used to choose a category and set up a continuation. (Since SwitchBack can only be used within a Sequence category, there is guaranteed to be at least one continuation in SwitchContinuations. The process is equivalent to the method of returning from a subroutine in other programming languages.) If ReturnVal is Waiting, execution ceases since a WaitForResponse has been executed. Similarly, if ReturnVal is RunTimeError, execution ceases and the stack of SwitchContinuations and SequenceContinuations is cleared. (RunTimeError is presently returned only in the event of a SwitchTo cycle violation.) Finally, if ReturnVal is Done (recall that a category cannot return value NotActivated or Continue), execution stops unless there was an InterruptSequence that has not yet been resumed. Recall that InterruptSequence stops execution of a Sequence category while all of the Standard and Default categories are executed, and then resumes execution of the Sequence category. Therefore, if a Done is reached while there is at least one CContinuation in the SequenceContinuations stack, that Sequence category is resumed. In the case where there is no SequenceContinuation, the SwitchContinuations stack can also be cleared, as there is no possibility of returning from any SwitchTo statements once a Done (that is not ending an interruption) is executed.

IV. Implementation of Automatic BOT Verification

A. Overview

In the present embodiment of the invention, the BOT author enables verification by including verification statements, referred to as "Example statements" in the BOT script. These Example statements are ignored during ordinary execution of the BOT. However, if the BOT author wishes to test the performance of the BOT, these statements are used as test cases for the verification mechanism. Further detail on the structure and use of these Example statements is given below.

Figure 9:
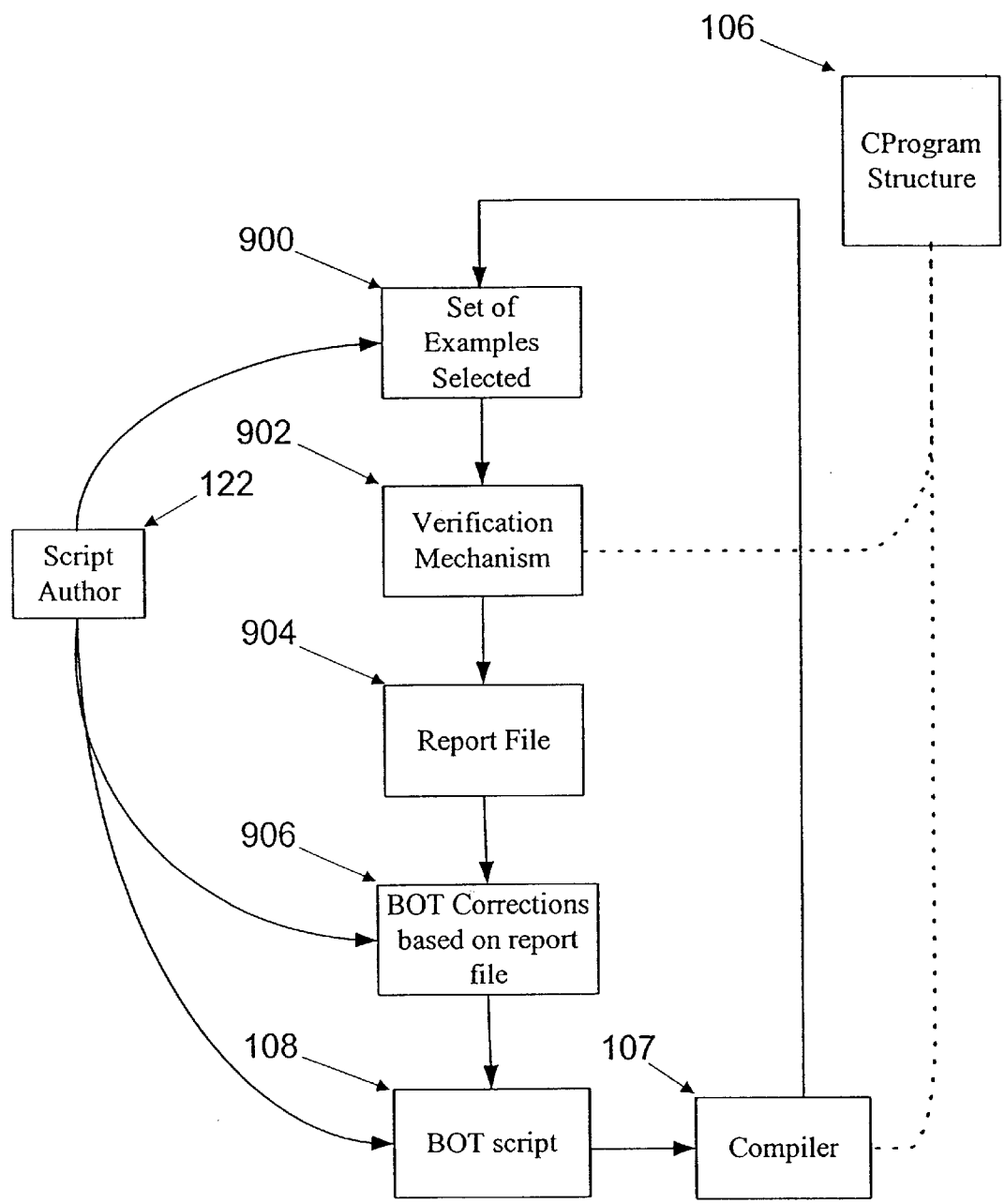
FIG. 9 depicts one view of an overall process of the use of the verification mechanism.

FIG. 9 gives an overview of one way in which the example verification mechanism might be used. The BOT author 122, when creating the BOT script, includes example statements in the BOT script 108. When the BOT script is compiled by the compiler 107, the resultant BOT object 106 contains the examples. When the BOT author 122 desires to test the BOT, they first select the set of examples 900 which are to be tested, consisting of all or some of the entire set of examples in the BOT script. These examples are tested by the verification mechanism 902, using the BOT object 106, as will be discussed in greater detail below. The result of this testing is a report file 904 detailing the errors that were found in the BOT object. The BOT author 122 can then use this report file 904 to make corrections 906 to the BOT script 108. The changed BOT script can then be recompiled by the compiler 107 and the process can be repeated as often as desired.

In the present BOT scripting language, Example statements are included within the body of a topic. Each Example statement represents a particular input that an end user might give to the BOT. Currently, these Example statements are limited to textual input. It will be appreciated that Example statements can easily be extended to include non-textual input as well, and that the present invention should not be limited to textual Example statements.

An Example statement is normally included inside an IF block that also contains one or more Say or Do statements. The inclusion of an Example statement in such a block indicates that, in response to each of the input strings given in the Example statement, the author intends the BOT to respond by executing the Say and/or Do statements contained in the block. Thus, the Example statement also serves as a helpful reminder to the BOT author of the input that the Say or Do statement was intended to respond to.

In practical usage, the BOT author will often want to include multiple Example inputs for a single block. In order to make the script more readable, these additional Example inputs can be placed outside the original topic through the use of the OtherExamples statement. An OtherExamples statement associates the original Example input with additional inputs that are intended to have the same response.

In addition, there may be inputs which are intended to produce different answers when asked in different circumstances. For instance, the question "Who is he?" may produce several different responses depending on the prior conversation. Such inputs can be tested by including them in an OtherExamples statement and including the WhenFocused keyword. The meaning of such examples is that they are intended to produce the appropriate answer if asked when the topic associated with the original Example is already the current focus of the conversation. (For instance, if the Focus of Attention mechanism described earlier is being used, the appropriate answer should be provided given that the topic is at the front of the Focus of Attention.) If the topic containing the original Example is not the current focus of the conversation, these Examples may produce any answer. As an example, consider the input question "Who is he?" This question should produce an answer describing Walter if Walter is the focus of the current conversation, while it may reasonably produce other answers if somebody else is the focus of the conversation. Such inputs need to be tested in a context-sensitive fashion, so that they do not produce false error messages.

After the BOT script is compiled, Examples are included within the Executable Program Object 106 in three places. First, they are included along with other actions in the body of the If..Then block where they are found. Second, a list of all the Examples found within the script is included in the CProgram structure, for easy access during verification. These Examples are split up into three types: standard examples, used for ordinary inputs; initial examples, used for initialization; and sequence examples, used to test sequential behaviors. These three types of examples are discussed further below. Finally, a mapping is included in the CProgram structure that contains all the OtherExamples, if any, associated with each string given as the argument of an Example statement, and information as to whether they are context-dependent examples or not.

In the current implementation, OtherExamples can only be specified for a fixed string, although the present invention should not be limited to the use of fixed strings when specifying variations of an Example. An example of a Topic in our scripting language that contains several Example statements is given below in Table 4.

TABLE 4

A SCRIPT PROGRAM CONTAINING EXAMPLE STATEMENTS

Topic "Walter" is
    IfHeard "who*is" and ("Walter", "he") Then
        Example "Who is Walter?";
        Say "Walter is the president of Neuromedia";
    Done TABLE 4-continued

A SCRIPT PROGRAM CONTAINING EXAMPLE STATEMENTS

```
    IfHeard "Walter" Then
        Example "Do you know who Walter is?";
        Say "You asked some question about Walter. . .";
    Done
EndTopic
```

B. The Execution of Example Statements

In order to verify the performance of a BOT, the BOT author first includes Example statements in the BOT script, as described in the previous section, while writing and modifying the BOT script. In the course of ordinary execution of the BOT script, these Example statements are completely ignored. In order to verify the performance of the BOT, the BOT author selects a verification command within the BOT development environment and then selects a set of Examples to verify. For instance, the author may select all the Examples within a particular file, or all the examples in the entire BOT script. These Examples are verified, as described below, and a text file report is produced detailing the errors that were found and, optionally, the correct responses that were given. It will be appreciated that there are other plausible interfaces to the Example verification mechanism, such as an interactive presentation of the results or the creation of a database containing the results, and that the present invention should not be limited to the production of a text file report of the results of verification.

As stated above, Examples are included within the BOT Executable Program Object in three places: within the body of If..Then blocks, in one of three lists of examples within the CProgram structure, according to example type, and in a mapping of OtherExamples in the CProgram structure.

Figure 10:
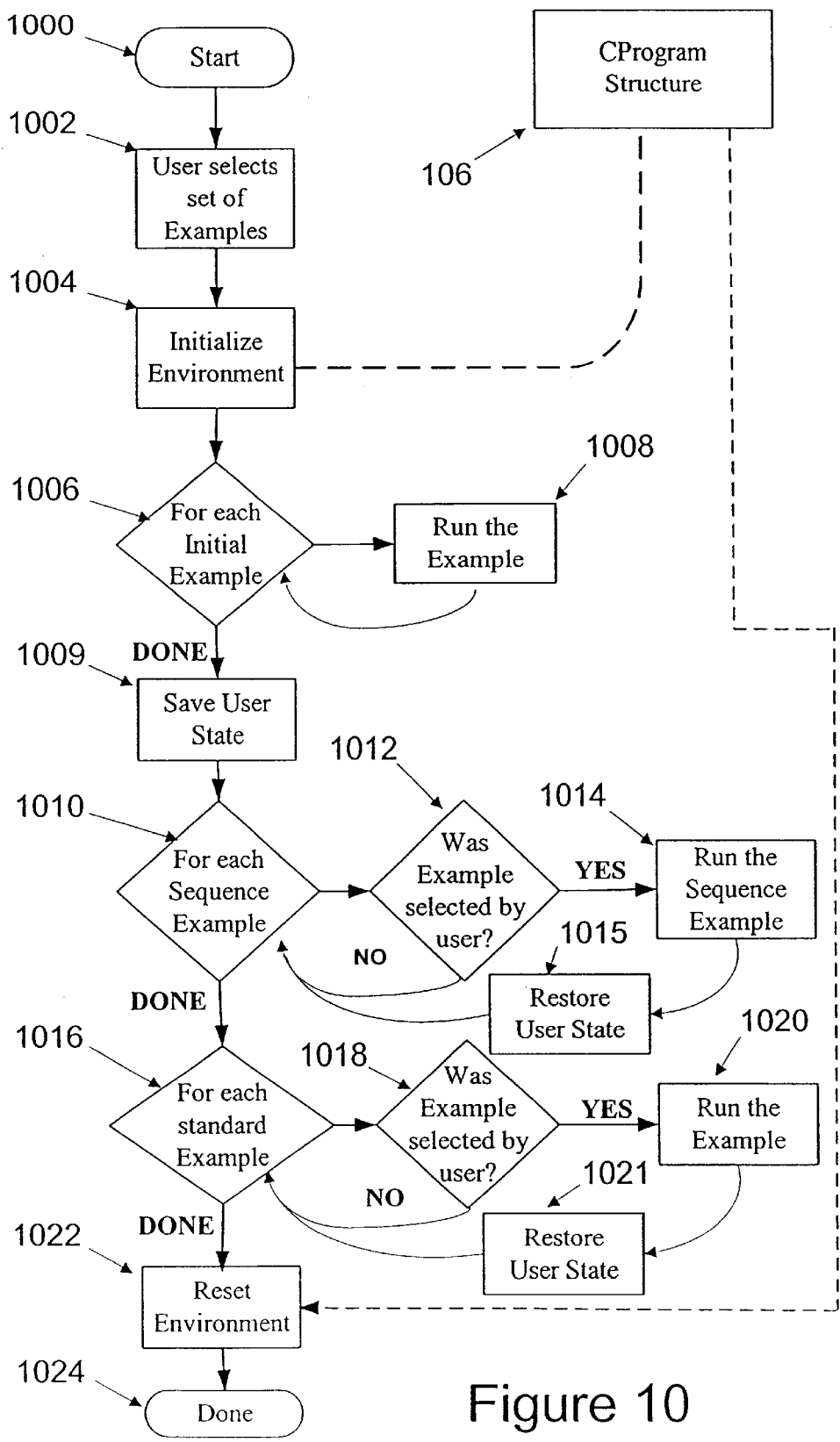
FIG. 10 depicts the overall behavior of the verification mechanism.

FIG. 10 shows the process of example verification in a BOT. Example verification begins at 1000. At 1002, the user selects the set of examples to be verified, and may select a number of options for the format of the output from the verification mechanism; for instance, the user may elect not to have each input and response output to the console window, as would be done during ordinary operation of the BOT. The verification mechanism then (at 1004) does any necessary initialization of the run-time environment 106 for the BOT, for instance to correctly set the output options chosen by the user at 1002. In the present implementation, this step insures that information from the run is stored in an Example report file, makes sure that output from the BOT is not passed on to any external connections the BOT may have with web pages, chat sites, etc., and sets appropriate flags in the execution program so that it will know to generate appropriate error messages when an Example produces incorrect output. It would be obvious to one skilled in the art that other methods of interface for a verification mechanism are possible, and that the scope of the present invention should not be limited to any particular interface for selecting the set of examples to be verified (including the possibility of automatically selecting all examples) or to any particular set of output options or interface for selecting such options.

The verification mechanism now iterates 1006, 1008 through the Initial Examples as described in the following section. It now saves the state of the user at 1009 so that all examples can be verified in an equivalent user state. It then iterates 1010, 1012, 1014, 1015 through the Sequence Examples as described in the following section. It now iterates 1016, 1018, 1020, 1021 over each of the standard examples. Since the results of the mechanism are intended to be independent of the order in which the Examples are tested, they can be tested in arbitrary order, although the current implementation tests them in the order in which they appear in the original scripts. In order to insure that the results are order-independent, the execution mechanism stores the state of the user at 1009 and restores this state at 1015, 1021 after each Example is tested, thus insuring that all Examples are tested in the same user state. It would be obvious to one skilled in the art that other ways of ordering the Examples to be tested are possible and that the scope of the present invention should not be limited to any particular method of ordering. Likewise, it would be obvious to one skilled in the art that Examples could be tested without restoring the user state before testing each Example.

Once an Example is selected from the list, it is tested 1018 to see whether it is one of the Examples that the user wishes to test—for instance, by examining the name of the file containing the Example. If it is, the Example is verified. The process 1020 of verifying each Example is described in more detail below. Finally, the user state stored at 1009 is restored at 1021, allowing further examples to be tested in the same state. Once iteration is complete, the verification mechanism resets 1022 the run-time environment 106 to its original settings, and terminates at 1024.

Figure 11:
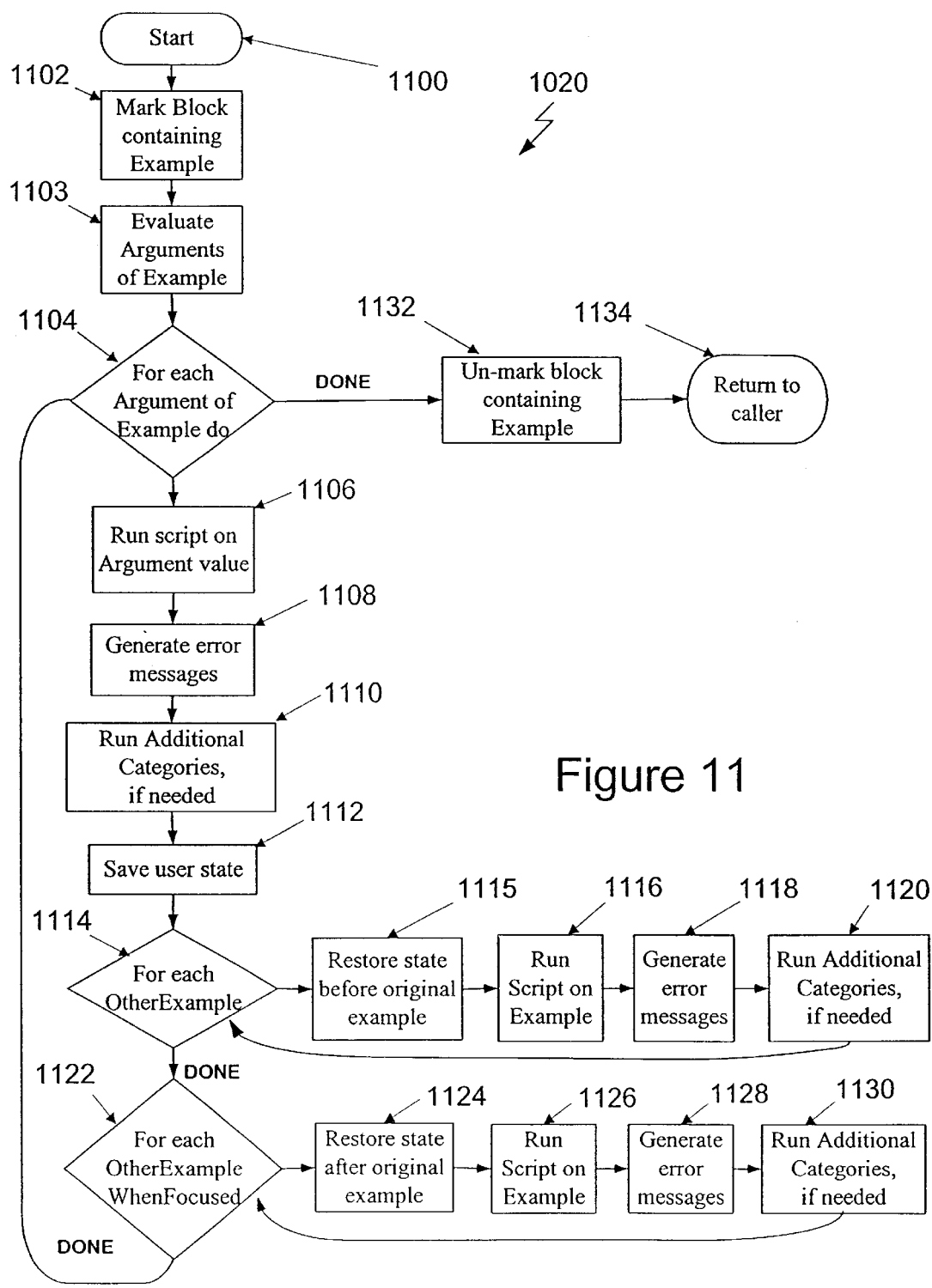
FIG. 11 depicts the detailed behavior of the verification mechanism when applied to a particular input that is to be verified.

FIG. 11 shows the process of verification of a single Example in the BOT, and corresponds to operation 1020 in FIG. 10. Execution starts at 1100. The verification mechanism first sets (at 1102) flags in all the If statements containing the example. As each command in the present scripting language is inside one or more If blocks, these flags may be used to produce diagnostic error messages if the Example does not produce the correct output. It then evaluates at 1103 the expressions (e.g. ordinarily fixed strings) that are arguments to the Example statement, in the standard way in which expressions are evaluated in the scripting language, producing a list of strings. It then iterates 1104 over each element of this list of strings. Each iteration starts at 1106 by running the script on the string, in the same way that the script would be run on an external input (although potentially not producing the same external output, due to the flags set at 1004.) Since a BOT script must be run with respect to a particular user, a "test user" record is created, or retrieved if one has already been created, in order to pass to CProgram::Run. This user record is used to store the Attention Focus List, the User Attribute Memory, and other properties of the hypothetical "conversation" that is taking place between the verification mechanism and the BOT.

The program handles the input exactly as it would have handled the same input from an external user. However, by default, Examples are verified in a "find all equivalent matches mode" that is different from the mode in which inputs are ordinarily processed. This mode can be turned off by the BOT author in the input selection process at 1002. In this mode, once a Done has been reached in a standard category, the program checks to see if there are any other categories that are active and have the same specificity as the category containing the Done. These categories are then executed, despite the Done that has already been reached. If only one category was selected, it indicates that the answer would have been given regardless of the context in which the input occurred. However, if more than one category was selected during this execution, it must be true that each of these categories would have been executed first if it had been the category at the front of the focus of attention. Therefore, each such category is a possible answer that might be given in response to the input in some context, and the set of such categories represents all such possible answers. The selection of categories according to the present implementation is discussed in greater detail in co-pending and co-assigned patent application Ser. No. 09/0 18,123, entitled "METHODS FOR AUTOMATICALLY SELECTING RESPONSES FOR A VIRTUAL ROBOT" to Tackett et al., filed in Feb. 3, 1998 and is herein incorporated by reference.

Once the argument has been run, the verification mechanism produces (1108) an error message, if needed, describing any errors that were found. Any time that a Say or Do statement is executed in response to an Example input, it is considered to have produced a response to the input (this includes any Say or Do statements that are executed in categories executed due to "find all equivalent matches mode"). There are three possible cases that can occur in response to an Example input:

1. If the execution process has executed the body of the If block that directly contains the Example statement, and no responses were given other than those found in that If block, then the Example is considered to have produced the correct answer. If the BOT author has chosen to have messages printed in response to correct answers, a message will be output to the Example report, otherwise the verification of that Example is complete.

2. If the execution process has executed the body of the If block but has also given responses other than the If block, a warning message is produced in the report file. This message can include, for instance, information about the other responses that were given and which topic was responsible for them, and the order in which the correct and incorrect responses were given.

3. If the execution process did not execute the body of the If block, the Example statement clearly did not produce the correct answer. This case can be further divided into the seven cases shown in Table 5 below. In each of these cases, useful diagnostic information can be included in the Example verification report regarding the cause of the error. First, if the category containing the Example was executed but the body of the If block was not, there are two possible cases. Either some If condition surrounding the example failed, or a Done or NextTopic was executed earlier in the category. If one of the If conditions failed, the flags that were set at 1102 in the conditions surrounding the Example will cause error messages to be printed out to the report file during the execution explaining why the If statement failed. If no such error message was printed out, the verification mechanism can deduce that the reason for the failure must have been that a Done or NextTopic was executed earlier in the category. Next, if the Example is in a Priority category that never got executed, a Done must have been executed in some earlier Priority category. Similarly, if the Example is in a Default category that never got executed, a Done must have been executed by some Priority, standard, or Sequence category, or an earlier Default category. Next, if the Example is in a Sequence category that never got executed, the Sequence category was clearly never called. Finally, if the Example is in a standard category that never got executed, there are two possible cases. Such a category was either not activated by the best-fit mechanism because some If statement within the block surrounding the example was not true, or was activated (i.e. all conditions in some block in the category were true) but was not selected. If the category was not active, the category containing the Example is executed anyway at 1110. Since the category was not active, there must be at least one If condition surrounding the Example that is not true, and since a flag was set for each of these If conditions, an error message will be generated when the category is executed explaining why the Example did not produce the correct response. If on the other hand the category was active, the verification mechanism at 1110 executes all remaining categories that are at least as specific as the one containing the Example, producing information as to all the other responses that might be given in preference to the desired response for the Example.

TABLE 5

POSSIBLE CAUSES FOR LACK OF CORRECT RESPONSE TO AN EXAMPLE

| Category containing Example executed? | Type of category containing Example | Cause |
| --- | --- | --- |
| Yes | Any | If condition failed |
|  | Any | Done earlier in category |
| No | Priority | Done in earlier Priority category |
|  | Default | Done in any earlier category |
|  | Sequence | Sequence category not called |
|  | Standard | If condition failed |
|  | Standard | Higher priority category selected |

Once an argument of the Example statement has been executed, the verification mechanism first stores the user state at 1112 so that it can be used for testing Examples WhenFocused. It now iterates 1114, 1115, 1116, 1118, 1120 over any other inputs that are included in OtherExamples statements as being equivalent to the original argument. OtherExamples are included in the Program Executable structure as a map from input strings to lists of other examples. Therefore, in order to test the other examples associated with an input, the verification mechanism simply needs to look up this input in the Other Example map and test each of the examples found there. In order to remove any dependence of the results on the order in which the OtherExamples are tested, the user state is restored 1115 to the state in which the user was before the original example was run at 1106. This "original state" was saved earlier, at 1009. The examples found in normal OtherExamples statements are then tested as given above, by 1116 running the script, 1118 generating error messages, and 1120 executing any other categories. The verification mechanism now iterates 1122, 1124, 1126, 1128, 1130 over any examples found in OtherExamples statements with the WhenFocused keyword. The mechanism currently assumes that the execution of the original argument at 1106 is enough to make the subject the focus of attention, and thus restores at 1124 the user state that was stored at 1112 (otherwise other topics may inadvertently become the focus of attention in the course of execution of intermediate examples.) The "WhenFocused" example is now run on the script at 1126, generates error messages at 1128, and executes other categories as needed at 1130. However, when the example is run at 1126, it is run without the "find all equivalent matches mode" described above. This will test if the input produces the correct response when that category is the primary focus of attention—which is what the user wishes to know—while not testing what response will be given if the category is not the primary focus of attention. Thus, the use of the WhenFocused keyword allows context-sensitive examples to be tested without generating spurious error messages warning that these context-sensitive examples might produce other responses.

As an alternative embodiment, at step 1124, the mechanism could instead of restoring a saved user state, directly modify the state of the focus of attention mechanism to make the category containing the original example the focus of attention. This implementation would also allow the "WhenFocused" example to be tested in a state in which said category is the primary focus of attention.

After all of the Other Examples of an argument of an Example statement have been verified, the verification mechanism returns to 1104 and continues with the next argument. Once it has verified all of the arguments, it resets at 1132 the flags that were set in the If conditions surrounding the Example at 1102, and returns to the caller at 1134 to continue with the next Example.

C. Extensions to the Example Mechanism

Verifying examples is similar to having a new user log in and type in all the Examples. Ordinary Examples are tested in arbitrary order, which can create a problem if a BOT has some kind of initialization routine such as a routine that asks for the user's name when they first log in. For instance, the first Example tested may produce the response "Hi, what is your name?" rather than a response to the example.

The Example verification mechanism described in the previous section can be extended to cover initialization routines by including a set of examples in the initialization routine that will be tested before any other Examples and will be tested regardless of the subset of Examples chosen for verification by the BOT author.

In the present implementation of the scripting language, these Examples are indicated by using the InitialExample statement. InitialExample statements are included in the initialization routines. Each InitialExample is given a non-negative integer (its index), immediately following the keyword InitialExample, that determines the order in which the InitialExamples are executed, and has exactly one argument. Otherwise, InitialExamples are equivalent to regular Examples. It is an error for more than one InitialExample to have the same index, or for an InitialExample to have more than one input string.

When the BOT script is compiled, all the InitialExamples found in the script are sorted according to index and stored in an array in the ProgramExecutable structure. At the beginning of each run of the Example verification routine, all of these InitialExamples are tested in order, at 1006 and 1008. All of the InitialExamples are run regardless of which examples were chosen for verification by the BOT author. The execution of the InitialExamples is done in the same method as shown in FIG. 11, although in the present implementation, OtherExamples are not used with InitialExamples, and the InitialExamples are never run in "find all matches mode." (Although since InitialExamples are normally included only in Priority categories, the "find all matches mode" would not make a difference in the result.) Note that the user state is saved 1009 after the execution of the initial examples, since the initial examples prepare the state of the user for the execution of the standard examples.

The Example verification mechanism described in the previous section is primarily useful for testing inputs in which the order of inputs is irrelevant. The mechanism can be easily extended to verify "sequences" of interaction as well. "Sequence" in this case refers to any series of interactions that are order-dependent, such as interactions in which the BOT asks a question of the user and processes one or more possible responses. Sequences are generally more difficult to test, because all of the possible branches of the interaction must be tested. For instance, consider the following code fragment:

```
Topic "Monitor diagnosis" is
        IfHeard "screen*black" Then
                Say "Is the monitor turned on?";
                WaitForResponse;
                IfHeard "yes" Then
                        Say "Isit plugged in?";
                        WaitForResponse;
                        IfHeard "yes" Then
                                SwitchTo "Problem diagnosis";
                        Done
                        Otherwise Always
                                Say "Try plugging it in";
                        Done
                Done
                Otherwise Always
                        Say "The on switch is located on the front";
                Done
        Done
EndTopic
```

In order to test this fragment, the initial question ("My screen is blank") has to be repeated at least 3 times, once for each possible line of answers (and probably more if the "problem diagnosis" sequence has multiple lines of answers.) This testing can be handled automatically by an extension of the Example mechanism.

In order to test a sequence in the present implementation of the invention, the BOT author first determines the input that initiates the interaction, in this case "My screen is blank". For the purpose of testing, we consider the "interaction" to be the set of all possible interactions that can arise directly from that initial input. In the present implementation of the invention, this initial input is assigned an integer as an "index", but the scope of the invention should not be limited to any particular indexing scheme for the examples that make up a sequence.

Next, the BOT author considers all the possible user responses that can follow the initial input. In this case, the robot responds to the initial input by asking "is it turned on?", to which there are two possible categories of user responses (discounting responses such as "I don't know" and irrelevant responses). Each response is assigned a letter or word that gets appended to the end of the index for that response. For instance, the response "yes" might be given the index "170.yes" or "170.y" while the response "no" might be given the response "170.no" or "170.n". Note that the letter or word used in the index is not used directly in testing the examples; only the actual text in the Example statement is used. Again, the scope of the present invention should not be limited to any particular naming scheme for these indices.

This process is continued for any user responses that might follow such user responses. In this case, the user response "yes" is followed by the robot response "Is it plugged in?", which would have two possible responses once again. As before, each of these is assigned a letter or word that is added to the existing index. For instance, the response "no" might be assigned the index "170.yes.no" while the response "yes" might be assigned the index "170.yes.yes". Note that once again, the index "170.yes.yes" is not directly used in testing; it merely indicates that the response "Yes" is intended as a follow-on to the interaction that led to the Example statement for "170.yes". Examples of further interactions within the "Problem diagnosis" topic would have indexes beginning with "170.yes.yes . . . ".

The Sequence does not contain any further interaction after the user response "no" and robot response "The on switch is located on the front", so there are no further examples continuing from "170.no".

In the current implementation of the scripting language, the index for each response is included in the Example statement immediately following the keyword Example, much like the InitialExample statement. Unlike InitialExample, however, testing of sequences is done with the standard Example keyword. Thus, the syntax of the examples described above is:

Example 170"My screen is blank";
Example 170.yes "Yes";
Example 170.no "No";
Example 170.yes.no "No";
Example 170.yes.yes "Yes";

It is an error to have more than one Example with the same index, or to have an index nX.Y (where n is an intenger, Y is a string, and X is zero or more strings with a period before each string) for which there is no Example with an index nX.

Figure 13:
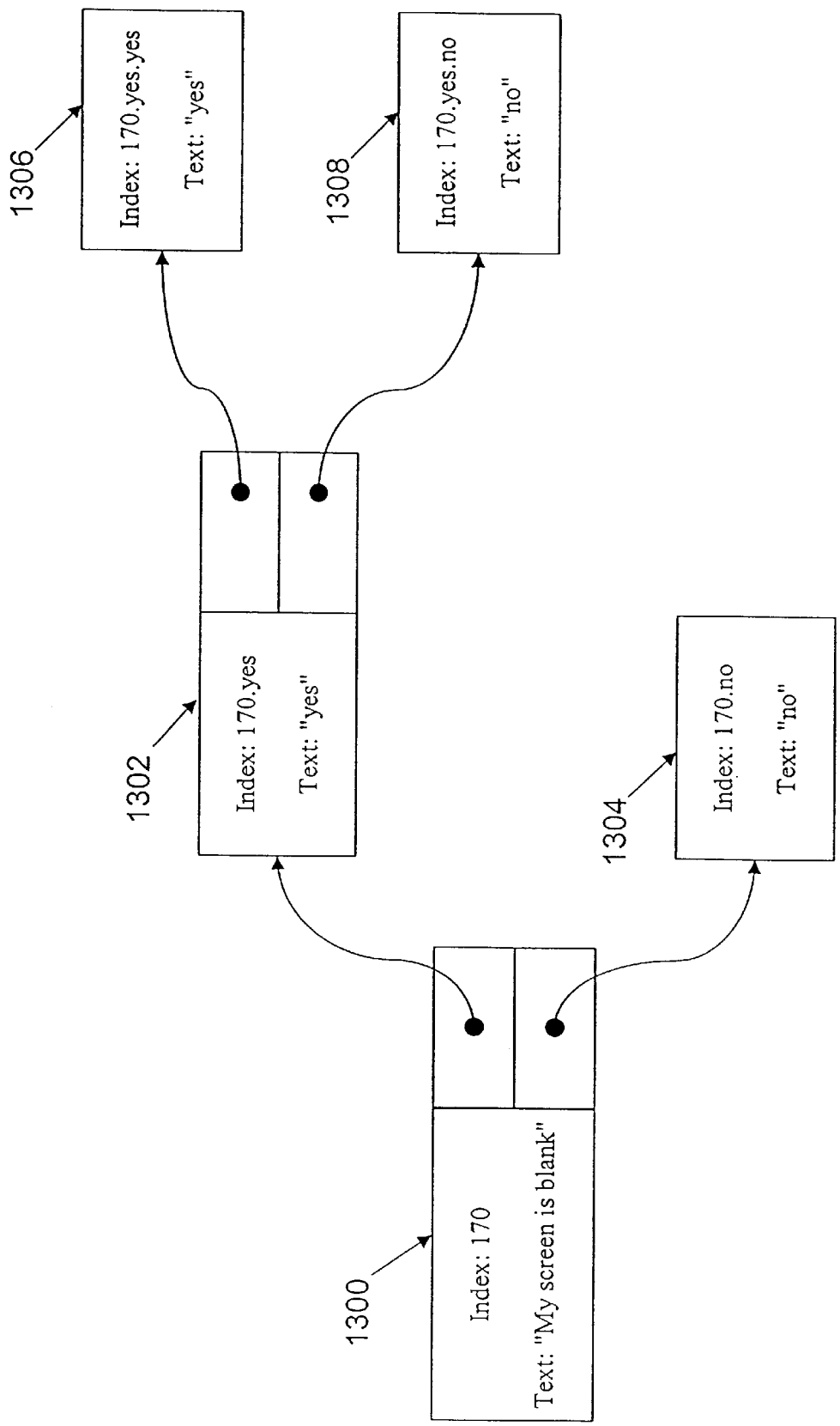
FIG. 13 depicts the structure that is created for the verification of a particular sequence of conditions discussed below.

When the BOT script is compiled, the sequence Examples are collected into groups according to the initial number in the index of each. We define the "original Example" in each group as the Example for which the index consists only of an integer. (As indicated in the above paragraph, there must be such an example for each group.) These original Examples are sorted and stored in an array in the ProgramExecutable structure. Each sequence Example, including the original Examples for each group, includes a mapping that includes each possible Example that can immediately follow the Example, according to the definitions above. FIG. 13 illustrates the Sequence example structure that is generated from the code fragment above once the Example statements described above are added. The original example 1300 for the group contains the example text "My screen is blank" and pointers to the two follow-up examples 1302 and 1304. The first follow-up 1302 has index "170.yes" and input text "yes", and contains pointers to two follow-ups 1306 and 1308. The other follow-up 1304 has index "170.no" and input text "no", and does not contain any follow-up links. Similarly, the follow-ups 1306 and 1308 to the example "170.yes" do not have any follow-up links. The execution of the example set shown in FIG. 13 is discussed below.

FIG. 10 shows the execution of the sequence Examples occurring during the iteration 1010, 1012, 1014, 1015 immediately following the InitialExamples. The iteration 1010, 1012, 1014, 1015 occurs over only the original sequence example in each group; the remainder of the sequence examples are tested during the execution process 1014. The original example is first tested 1012 to see whether it is one of the Examples that the user wishes to test, as was done for the standard examples at 1018. If it is selected, it is executed 1014 by a special execution process described below, and the user state is reset 1015 so that further examples may be tested in the same state. It would be obvious to one skilled in the art that sequence Examples could equivalently be tested along with or after the standard Examples, and that the scope of the present invention should not be limited to testing sequences at any particular time.

Figure 12:
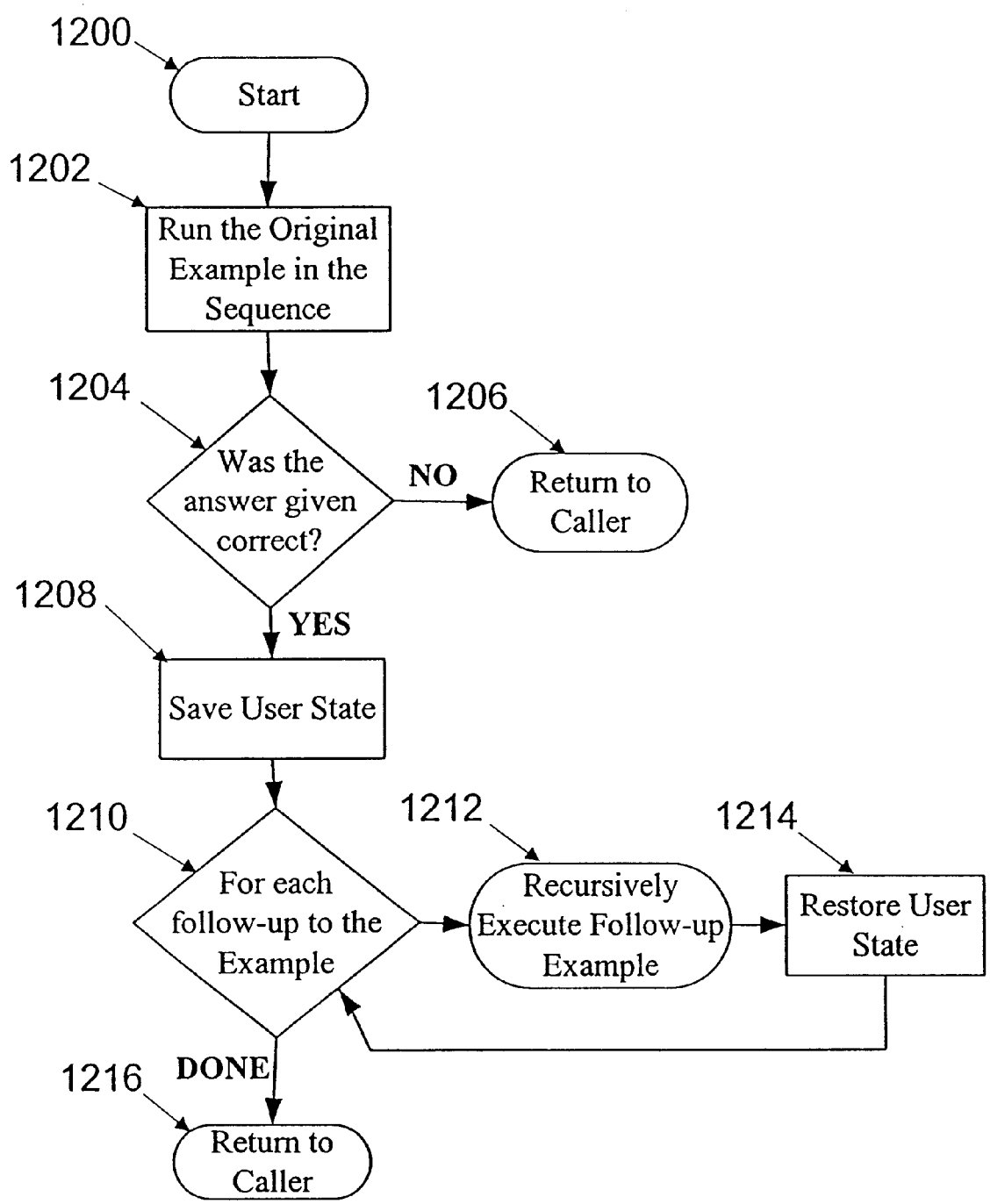
FIG. 12 depicts the detailed behavior of the verification mechanism when applied to a special case of conditions that are to be verified in a particular sequence

FIG. 12 illustrates the execution of a single group of Sequence Examples, corresponding to the execution process at 1014. Execution starts at 1200, and begins by executing 1202 the original example for the group, using the execution process shown in FIG. 11. If test 1204 determines that the example was given an incorrect answer, further testing of the sequence would not produce meaningful results (since further examples in the sequence make the assumption that earlier examples produced the correct result), and execution is terminated at 1206. If instead a correct answer was given, the state of the test user is saved at 1208, so that each follow-up to the Example can be executed in the same context. (Note that if there are multiple arguments and/or OtherExamples defined for the Example, they are tested during the execution 1202 to insure that they produce the same result.) The verification mechanism now iterates 1210, 1212, 1214 over each possible follow-up to the example. Each follow-up is executed at 1212 with a recursive call to the same process shown in FIG. 12, since the follow-up is itself a Sequence Example and may have its own follow-ups. After execution of the follow-up is complete, the user state (stored in 1208) is restored at 1214, and iteration continues at 1210. Once iteration is complete, control returns to the caller at 1216.

Thus, the result of the Example verification is equivalent to the result that would be generated if all possible sequences of Examples were tested, but without the possibility of having to test a number of inputs that is exponential in the number of Examples given. The detailed methods used in the compilation and execution of sequences of Examples would be well known to one skilled in the art.

In the present implementation of the mechanism, the initial statement in each sequence interaction is tested in "Find All Matches" mode; all other statements are not since they are assumed to follow the initial statement.

D. Examples of BOT Verification using Example Statements

We will now discuss several instances of the example verification mechanism in operation. The BOT script shown below includes several Example statements. For explanatory purposes, the following BOT script contains intentional errors in order to illustrate the testing mechanisms of the present invention.

---

Topic "Walter" is
    IfHeard "who*is" and ("Walter", "he") Then
        Example "Who is Walter?";
        Say "Walter is president of Neuromedia";
    Done
    IfHeard "Walter" Then
        Example "Do you know who Walter is?";
        Say "You asked some question about Walter . . . ";
    Done
EndTopic
Topic "Where Walter works" is
    IfHeard "work#" Then
        Example "Who is Walter working for?";
        Say "Walter works for Neuromedia";
    Done
EndTopic
OtherExamples of "Who is Walter?" are
    "Who is Dr. Tackett?";
OtherExamples of "Who is Walter?" WhenFocused are
    "Who is he?";

---

Suppose that the BOT author chooses to verify all the Example statements in the above BOT script. For this description, we will assume that the BOT author has chosen to print out information about both correct and incorrect examples. The entire output of the verification mechanism is shown below in Table 6.

There are no IntialExamples or Sequence Examples in the script, so after initialization, the verification mechanism begins with the first standard example, "Who is Walter?". Following the flowchart in FIG. 11, the IfHeard condition preceding the Example is marked (at 1102), the arguments of the Example are evaluated 1103 (in this case, evaluation is trivial) and the script is run (at 1106) on the input "Who is Walter". In this case, the script produces the correct response, and a message indicating that the response is correct is output (at 1108.) No additional categories need to be executed, so the user state is saved (at 1112).

The verification mechanism now iterates over all Other-Examples of the input, and begins with the input "Who is Dr. Tackett?". The original user state is first restored 1115, in this case producing no relevant changes. The script is next run on the example (at 1116). In this case, no category is selected as the input does not match any set of conditions in the BOT script. Since the category containing the Example ("Walter") is a standard category, and since no higher priority category was selected, the verification mechanism can deduce that an if condition must have failed. Therefore, as presented in Table 5 above, the verification mechanism runs the category "Walter". Since the IfHeard statement was marked (at 1102), when it is executed it outputs a message saying that the pattern "Who is Dr. Tackett?" did not match any of the patterns.

All standard OtherExamples of the input "Who is Walter?" have now been tested, and the verification mechanism now iterates over all OtherExamples WhenFocused of the input, beginning with the input "Who is he?". It first restores the user state at 1124 (it was saved at 1112), insuring that the topic "Walter" is the focus of attention (although it does not matter in this case.) It then runs the script on the input at 1126, and receives the correct answer, so a message is output at 1128 indicating that the response is correct.

The verification mechanism has now completed all OtherExamples for the input "Who is Walter?" and returns to the iteration 1104. Since there are no other arguments of this Example statement, iteration terminates, the IfHeard condition is unmarked at 1132, and the verification mechanism moves on to the next example.

The next example is "Do you know who Walter is?", found in the next block in the topic "Walter". The block is marked (1102) and the example is run through the BOT program (1106). It produces the response "Walter is the president of Neuromedia", which is not the response that corresponds to the Example statement (although in this case it is a reasonable response.) Since the Say statement that was executed is outside the block, an error messages is output during execution, indicating that an incorrect response was given. Finally, once execution is complete, the verification mechanism determines that the block containing the Example was not executed, so an error message is printed (at 1108.) Since the category was executed, and the block was not, execution must have terminated earlier in the category, and an appropriate messages is output. There are no Other-Examples corresponding to the example "Do you know who Walter is?", so execution switches to the next Example.

Finally, the example "Who is Walter working for?" is tested. In this case, the input matches blocks in both topics "Walter" and "Where Walter works". The BOT execution mechanism selects the topic "Walter" as being a better fit to the question. Therefore, the answer "Walter is the president of Neuromedia" is given. Since this answer is not in the block containing the Example, an error message is output during execution. Once execution is complete, the verification mechanism determines that the category containing the Example was not executed. Since in this case, the category is a standard category and some other standard category was executed, the other category must have been selected as a more appropriate answer. As described earlier, the verification mechanism executes the category containing the Example at 1110, and provides appropriate information about both the example category and the category that was executed first instead.

There are no further examples to be tested, so summary information is output and the verification operation is complete. A transcript of the output from the verification mechanism in this case is shown in Table 6.

TABLE 6

OUTPUT FROM TESTING OF EXAMPLE SCRIPT

Information for Example "Who is Walter?":
>>>Selecting: Category 'Walter'
Correct answer given:
Robot Says: Walter is the president of Neuromedia
Information for Example "Who is Dr. Tackett?":
ERROR: Example "Who is Dr. Tackett?" in Topic 'Walter' (in Example.g line 3) was not hit because:
Input 'Who is Dr. Tackett?' did not match any pattern
Information for Example "Who is he?" WhenFocused:
Correct answer given:
Robot Says: Walter is the president of Neuromedia
Information for Example "Do you know who Walter is?":
>>>Selecting: Category 'Walter'
Incorrect answer given:
Robot Says: Walter is the president of Neuromedia
ERROR: Example "Do you know who Walter is?" in Topic 'Walter' (in Example.g line 7) was not hit because:
An If block earlier in Topic 'Walter' was executed instead - see above
Information for Example "Who is Walter working for?":
>>>Selecting: Category 'Walter'
Incorrect answer given:
Robot Says: Walter is the president of Neuromedia
ERROR: Example "Who is Walter working for?" in Topic 'Where Walter works' (in Example.g line 14) was not hit because:
Best answer had specificity value 3753
>>>Selecting: Category 'Where Walter works'(Specificity 3169)
Correct answer given:
Robot Says: Walter works for Neuromedia
Summary: 5 Examples were tested.
 2 were correct, 0 gave the correct answer plus others, 3 did not give the correct answer.

The following topic illustrates the use of InitialExamples. A name capture topic such as this might be found in many BOT scripts. If InitialExamples are not given for this topic, the first example tested by the verification mechanism would produce the response "Hi, what's your name?", the second would produce the response "What is your email address?", and so on. Once the three InitialExamples given below are added to the topic, these examples are given to the BOT before any other examples, regardless of which examples were selected for verification by the user.

```
Priority Topic "Name Capture" is
Always
        //"hi" here functions as a dummy first input;
        InitialExample 1 "hi";
        Say "Hi, what's your name?";
        WaitForResponse;
        //"Example Tester" would be given as the response.
        InitialExample 2 "Example Tester";
        Remember ?Name is ?WhatUserSaid;
        Say "What is your email address?";
        WaitForResponse;
        //the address below would be given as the response
        InitialExample 3 "nobody@neurostudios.com";
        Remember ?Email is ?WhatUserSaid;
        Say "Please ask me some questions";
        Suppress this;
        //other examples can now be tested without interference
        //from Topic "Name Capture".
Done
EndTopic
```

The following topic illustrates the use of sequence examples, and is based on the discussion of sequence examples in the previous section.

```
Topic "Monitor diagnosis" is
        IfHeard "screen*blank" Then
                Example 170 "My screen is blank";
                Say "Is the monitor turned on?";
                WaitForResponse;
                IfHeard "yes" Then
                        Example 170.yes "Yes";
                        Say "Is it plugged in?";
                        WaitForResponse;
                        IfHeard "yes" Then
                                Example 170.yes.yes "Yes";
                                Switch to "Problem diagnosis";
                        Done
                        Otherwise Always
                                Example 170.yes.no "No";
                                Say "Try plugging it in";
                        Done
                Done
                Otherwise Always
                        Example 170.no "No";
                        Say "The on switch is located on the front";
                Done
        Done
EndTopic
```

FIG. 13 illustrates the SequenceExample data structure created from the above script. The initial example in the sequence is Example 170, "My screen is blank". This example is stored as sequence example 1300 and is kept in an array in the ProgramExecutable structure, indexed by the index 170. The sequence example 1300 has pointers to all possible follow-ups, sequence example 1302 (the example 170.yes above) and sequence example 1304 (the example 170.no above.) There are no follow-ups to example 170.no, but example 170.yes has two follow-ups, sequence example 1306 (the example 170.yes.yes above) and sequence example 1308 (the example 170.yes.no above).

Execution of the sequence examples follows the flowchart given in FIG. 12. After starting at 1200, the first example 1300, with text "My screen is blank", is executed at 1202, exactly as standard examples are run. The example run terminates at the WaitForResponse immediately following the question "Is the monitor turned on?". Assuming that the answer given is correct, the user state following the example run (including the information associated with the WaitForResponse) is saved at 1208. The sequence example 1300 has two follow-ups, so the execution routine is recursively called on follow-up sequence example 1302. Execution on example 1302 begins at 1200 and runs the example at 1202. Execution resumes at the WaitForResponse, so the text value "yes" for the example 1302 leads to the response "Is it plugged in?". This is the correct answer, so the user state (which is currently at the WaitForResponse following "Is it plugged in?") is saved at 1208, and execution continues with the follow-ups to sequence example 1302. First, the execution mechanism is recursively called on sequence example 1306. Execution resumes after the WaitForResponse after "Is it plugged in?", so the text value "yes" for the example 1306 produces the correct response by switching to "Problem diagnosis". The user state at this point is saved, but since sequence example 1306 contains no follow-up examples, execution terminates at 1216 and execution returns to sequence example 1302. Execution for this example now restores (at 1214) the user state that was saved at 1208 (the state that was at the WaitForResponse following "Is it plugged in"). Iteration continues with follow-up sequence example 1308, which is equivalent to the execution of sequence example 1306. Once execution of sequence example 1308 is complete and control returns to the execution of sequence example 1302, the user state is restored once again. This time there are no further follow-up examples, so execution on sequence example 1302 terminates and control returns to the execution on sequence example 1300. The user state that was saved after the sequence example 1300 was originally executed (i.e. the WaitForResponse after the question "Is the monitor turned on") is restored, and iteration continues with follow-up sequence example 1304. The text "no" for this example produces the correct response "The on switch is located on the front". There are no follow-ups to sequence example 1304, so control returns to the execution for sequence example 1300. There are no further follow-ups to sequence example 1300, so execution for this sequence example is complete.

The execution described above effectively tested the following three complete interactions, although saving and restoration of user states were used to simulate the repetition of the initial statement and the "yes" response to the first question. Note that if the initial statement or the "yes" response had produced an incorrect response, testing of the follow-ups would not have been done, as the follow-ups could not have been tested in their correct context.

User says: My screen is blank
Robot says: Is the monitor turned on?
User says: Yes
Robot says: Is it plugged in?
User says: Yes
User says: My screen is blank
Robot says: Is the monitor turned on?
User says: Yes
Robot says: Is it plugged in?
User says: No
User says: My screen is blank
Robot says: Is the monitor turned on?

User says: No
Robot says: The on switch is located on the front

We claim:

1. In an automated interface program designed to interact and communicate with users, said program executing actions when a category among a predefined set of categories is activated, a method is disclosed for automatically verifying the performance of said program, the steps of said method comprising:
   (a) defining conditions within categories in the program, each said condition comprising at least one response which could be given if said condition is satisfied;
   (b) defining within the program at least one example statement associated with a category, wherein the at least one example statement is indicative of user input to activate the category;
   (c) executing said program under said at least one example statement;
   (d) determining whether the associated condition is satisfied under said at least one example statement; and
   (e) determining whether the response associated with said condition is given under said at least one example statement.

2. A method of verifying the performance of an automated interface program designed to interact and communicate with users providing user input, the method comprising:
   (a) defining a plurality of categories, each category having a condition and a response associated with the category, wherein the response is initiated when a user input meets the condition to activate the category;
   (b) selecting an example statement from a set of example statements defined within the program, wherein each example statement is indicative of a user input;
   (c) executing the program using the selected example statement as the user input;
   (d) determining whether a category is activated by the selected example statement;
   (e) determining whether a response is produced by the selected example statement; and
   (f) verifying the program based on the determinations of (d) and (e).

3. The method of claim 2, wherein verifying the program comprises:
   identifying a correct output state if:
      a category activated by the selected example statement includes an example statement that matches the selected example statement, and
      a response associated with the category activated by the selected example statement is the only response produced.

4. The method of claim 2, wherein verifying the program comprises:
   identifying an error output state if:
      a category activated by the selected example statement includes an example statement that matches the selected example statement, and
      a response associated with a category other than the category activated by the selected example statement is produced.

5. The method of claim 2, wherein verifying the program comprises:
   identifying an error output state if:
      a category activated by the selected example statement includes an example statement that matches the selected example statement; and
      no response is produced.

6. A computer-readable storage medium containing computer executable code to verify the performance of an automated interface program designed to interact and communicate with users providing user input by instructing a computer to operate as follows:
   (a) defining a plurality of categories, each category having a condition and a response associated with the category, wherein the response is initiated when a user input meets the condition to activate the category;
   (b) selecting an example statement from a set of example statements defined within the program, wherein each example statement is indicative of a user input;
   (c) executing the program using the selected example statement as the user input;
   (d) determining whether a category is activated by the selected example statement;
   (e) determining whether a response is produced by the selected example statement; and
   (f) verifying the program based on the determinations of (d) and (e).

7. The computer-readable storage medium of claim 6, wherein verifying the program comprises:
   identifying a correct output state if:
      a category activated by the selected example statement includes an example statement that matches the selected example statement, and
      a response associated with the category activated by the selected example statement is the only response produced.

8. The computer-readable storage medium of claim 6, wherein verifying the program comprises:
   identifying an error output state if:
      a category activated by the selected example statement includes an example statement that matches the selected example statement, and
      a response associated with a category other than the category activated by the selected example statement is produced.

9. The computer-readable storage medium of claim 6, wherein verifying the program comprises:
   identifying an error output state if:
      a category activated by the selected example statement includes an example statement that matches the selected example statement; and
      no response is produced.

* * * * *